US012217705B2

(12) United States Patent

Ma et al.

(10) Patent No.: US 12,217,705 B2
(45) Date of Patent: Feb. 4, 2025

(54) DRIVING CIRCUIT, DRIVING METHOD, DISPLAY DEVICE AND DISPLAY CONTROL METHOD

(71) Applicants: Yunnan Invensight Optoelectronics Technology Co., Ltd., Yunnan (CN); BOE TECHNOLOGY GROUP CO., LTD., Beijing (CN)

(72) Inventors: Yaoxi Ma, Beijing (CN); Longfei Fan, Beijing (CN); Shanghong Jiang, Beijing (CN); Pengcheng Lu, Beijing (CN); Shengji Yang, Beijing (CN); Xiaochuan Chen, Beijing (CN); Dachao Li, Beijing (CN)

(73) Assignees: Yunnan Invensight Optoelectronics Technology Co., Ltd., Yunnan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/025,521

(22) PCT Filed: Jun. 24, 2022

(86) PCT No.: PCT/CN2022/101045

§ 371 (c)(1),
(2) Date: Mar. 9, 2023

(87) PCT Pub. No.: WO2023/245602

PCT Pub. Date: Dec. 28, 2023

(65) Prior Publication Data

US 2024/0296802 A1 Sep. 5, 2024

(51) Int. Cl.
*G09G 3/3291* (2016.01)

(52) U.S. Cl.
CPC ... *G09G 3/3291* (2013.01); *G09G 2300/0819* (2013.01); *G09G 2300/0852* (2013.01); *G09G 2310/0286* (2013.01)

(58) Field of Classification Search
CPC ......... G09G 3/3291; G09G 2300/0819; G09G 2300/0852; G09G 2310/0286
See application file for complete search history.

(56) References Cited

U.S. PATENT DOCUMENTS

2014/0253524 A1 9/2014 Huang et al.
2016/0055798 A1* 2/2016 Song .................... G09G 3/3233 345/691

(Continued)

FOREIGN PATENT DOCUMENTS

CN 105118419 A 12/2015
CN 106328040 A 1/2017

(Continued)

*Primary Examiner* — Hong Zhou
(74) *Attorney, Agent, or Firm* — WHDA, LLP

(57) ABSTRACT

A driving circuit, a driving method, a display device, and a display control method are provided. The driving circuit includes multi-stage driving units and an on/off control circuit. Each of the driving units includes an input end and a driving signal output end, and each of the driving units is configured for outputting a corresponding driving signal via the driving signal output end according to an input signal provided by the input end. The input end of a first-stage driving unit is electrically connected to a start signal end. The on/off control circuit is electrically connected to an on/off control end and input ends of the multi-stage driving units, and configured for controlling the electric connection or electric disconnection of the input ends of the multi-stage driving units under the control of an on/off control signal provided by the on/off control end.

19 Claims, 9 Drawing Sheets

(56) References Cited

U.S. PATENT DOCUMENTS

| | | | | |
|---|---|---|---|---|
| 2016/0307499 | A1 | 10/2016 | Toyomura et al. | |
| 2017/0186362 | A1* | 6/2017 | Shim | G09G 3/3266 |
| 2017/0186378 | A1* | 6/2017 | Na | G09G 3/3233 |
| 2017/0193943 | A1 | 7/2017 | Cao | |
| 2020/0027404 | A1* | 1/2020 | Li | G09G 3/3266 |
| 2021/0327324 | A1 | 10/2021 | Wang et al. | |
| 2021/0358386 | A1 | 11/2021 | Cao et al. | |
| 2023/0065185 | A1* | 3/2023 | Lee | G09G 3/2096 |

FOREIGN PATENT DOCUMENTS

| | | | |
|---|---|---|---|
| CN | 106681568 | A | 5/2017 |
| CN | 104871233 | B | 2/2020 |
| CN | 112967678 | A | 6/2021 |
| CN | 113436585 | A | 9/2021 |

* cited by examiner

DRIVING CIRCUIT, DRIVING METHOD, DISPLAY DEVICE AND DISPLAY CONTROL METHOD

CROSS-REFERENCE TO RELATED APPLICATION

The present application is the U.S. national phase of PCT Application No. PCT/CN2022/101045 filed on Jun. 24, 2022, which is incorporated herein by reference in its entirety.

TECHNICAL FIELD

The present disclosure relates to the field of display technology, and particularly to a driving circuit, a driving method, a display device, and a display control method.

BACKGROUND

In prior art, with respect to a conventional driving circuit, when the initial voltage and the data voltage are required to be sequentially inputted to the pixel circuit in the same frame time, the timing of the data voltage between connections of multiple rows of pixel circuits may overlap, resulting in an abnormal operation of the pixel circuit.

SUMMARY

In one aspect, the present disclosure provides in some embodiments a driving circuit, including multi-stage driving units and an on/off control circuit; wherein each of the multi-stage driving units includes an input end and a driving signal output end, and configured for outputting, according to an input signal provided by the input end, a corresponding driving signal via the driving signal output end;

an input end of a first-stage driving unit of the multi-stage driving units is electrically connected to a start signal end;

the on/off control circuit is electrically connected to an on/off control end and the input ends of the multi-stage driving units, and configured for controlling, under the control of an on/off control signal provided by the on/off control end, electric connection or electric disconnection of the input ends of the multi-stage driving units, to control each of the multi-stage driving units to output a valid driving signal in a first half of a frame time, and control the multi-stage driving units to output the valid driving signals in turn in a second half of the frame time.

Optionally, the driving circuit includes N-stage driving units, the N being a positive integer greater than 1; wherein the driving circuit further includes a forward scan control circuit;

the forward scan control circuit is electrically connected to a forward scan control end, a driving signal output end of an $n^{th}$ stage driving unit and a input end of an $(n+1)^{th}$-stage driving unit, and configured for controlling, under the control of a forward scan control signal provided by the forward scan control end, electric connection between the driving signal output end of the $n^{th}$-stage driving unit and the input end of the $(n+1)^{th}$ stage driving unit;

the n+1 is less than or equal to the N, and the n is a positive integer.

Optionally, the driving circuit includes N-stage driving units, the N being a positive integer greater than 1; wherein the driving circuit further includes a reverse scan control circuit;

the reverse scan control circuit is electrically connected to a reverse scan control end, an input end of an $n^{th}$-stage driving unit and a driving signal output end of an $(n+1)^{th}$ stage driving unit, and configured for controlling, under the control of a reverse scan control signal provided by the reverse scan control end, electric connection between the input end of the $n^{th}$-stage driving unit and the driving signal output end of the $(n+1)^{th}$ stage driving unit;

the n+1 is less than or equal to the N, and the n is a positive integer.

Optionally, the driving circuit includes N-stage driving units, the N being a positive integer greater than 1; wherein the on/off control circuit includes N−1 on/off control transistors;

a control electrode of an $n^{th}$ on/off control transistor is electrically connected to the on/off control end, a first electrode of the $n^{th}$ on/off control transistor is electrically connected to the input end of the $n^{th}$-stage driving unit, and a second electrode of the $n^{th}$ on/off control transistor is electrically connected to the input end of the $(n+1)^{th}$-stage driving unit;

the n+1 is less than or equal to the N, and the n is a positive integer.

Optionally, the N−1 on/off control transistors are all n-type transistors, or the N−1 on/off control transistors are all p-type transistors.

Optionally, the forward scan control circuit includes N−1 forward scan control transistors;

a control electrode of an $n^{th}$ forward scan control transistor is electrically connected to the forward scan control end, a first electrode of the $n^{th}$ forward scan control transistor is electrically connected to the driving signal output end of the $n^{th}$-stage driving unit, and a second electrode of the $n^{th}$ forward scan control transistor is electrically connected to the input end of the $(n+1)^{th}$-stage driving unit.

Optionally, the N−1 forward scan control transistors are all n-type transistors, or the N−1 forward scan control transistors are all p-type transistors.

Optionally, the reverse scan control circuit includes N−1 reverse scan control transistors;

a control electrode of an $n^{th}$ reverse scan control transistor is electrically connected to the reverse scan control end, a first electrode of the $n^{th}$ reverse scan control transistor is electrically connected to the input end of the $n^{th}$-stage driving unit, and a second electrode of the $n^{th}$ reverse scan control transistor is electrically connected to the driving signal output end of the $(n+1)^{th}$-stage driving unit.

Optionally, the N−1 reverse scan control transistors are all n-type transistors, or the N−1 reverse scan control transistors are all p-type transistors.

Optionally, each of the driving units includes a first node control circuit, a second node control circuit, a first energy storage circuit, a second energy storage circuit, and an output circuit;

the first node control circuit is electrically connected to a first clock signal end, an input end, a first node, a second clock signal end, a second node and a first voltage end, and configured for controlling, under the control of a first clock signal provided by the first clock signal end, electric connection between the first node and the input end, and controlling, under the control of a second clock signal provided by the second clock signal end and a potential of the second node, electric connection between the first node and the first voltage end;

the second node control circuit is electrically connected to the first node, the second node, the first clock signal end and the second voltage end, and configured for controlling, under the control of a potential of the first node, electric connection between the second node and the first clock signal end, and controlling, under the control of the first clock signal, electric connection between the second node and the second voltage end;

the first energy storage circuit is electrically connected to the first node, and configured for storing electrical energy;

the second energy storage circuit is electrically connected to the second node, and configured for storing electrical energy;

the output circuit is electrically connected to the first node, the second node, the first voltage end, the second clock signal end and the driving signal output end, and configured for controlling, under the control of the potential of the first node, electric connection between the driving signal output end and the second clock signal end, and controlling, under the control of the potential of the second node, electric connection between the driving signal output end and the first voltage end.

Optionally, each of the driving units includes a first node control circuit, a second node control circuit, an output control node control circuit, a first energy storage circuit, a second energy storage circuit, and an output circuit;

the first node control circuit is electrically connected to a first clock signal end, an input end, a first node, a second clock signal end, a second node and a first voltage end, and configured for controlling, under the control of a first clock signal provided by the first clock signal end, electric connection between the first node and the input end, and controlling, under the control of a second clock signal provided by the second clock signal end and a potential of the second node, electric connection between the first node and the first voltage end;

the second node control circuit is electrically connected to the first node, the second node, the first clock signal end and the second voltage end, and configured for controlling, under the control of a potential of the first node, electric connection between the second node and the first clock signal end, and controlling, under the control of the first clock signal, electric connection between the second node and the second voltage end;

the output control node control circuit is electrically connected to the second voltage end, the first node and the output control node, and configured for controlling, under the control of a second voltage signal provided by the second voltage end, electric connection between the first node and the output control node;

the first energy storage circuit is electrically connected to the output control node, and configured for storing electrical energy;

the second energy storage circuit is electrically connected to the second node, and configured for storing electrical energy;

the output circuit is electrically connected to the output control node, the second node, the first voltage end, the second clock signal end and the driving signal output end, and configured for controlling, under the control of a potential of the output control node, electric connection between the driving signal output end and the second clock signal end, and controlling, under the control of the potential of the second node, electric connection between the driving signal output end and the first voltage end.

In a second aspect, the present disclosure provides in some embodiments a driving method performed by the above-mentioned driving circuit. The driving method includes:

controlling, by the on/off control circuit under the control of the on/off control signal, the electric connection or the electric disconnection of the input ends of the multi-stage driving units, to control each of the driving units of the driving circuit to output the valid driving signal in the first half of the frame time, and control the multi-stage driving units to output the valid driving signals in turn in the second half of the frame time.

Optionally, the driving circuit is configured for providing driving signals for pixel circuits of a display panel, and the first half of the frame time includes a first input stage and a first output stage arranged sequentially in that order, and the driving method includes:

in the first input stage, controlling, by the on/off control circuit under the control of the on/off control signal, electric connection of the input ends of the multi-stage driving units;

in the first output stage, outputting, by each of the driving units of the driving circuit, the valid driving signals;

in the second half of the frame time, controlling, by the on/off control circuit under the control of the on/off control signal, the electric disconnection of the input ends of the multi-stage driving units, to enable the multi-stage driving units of the driving circuit to output the valid driving signals in turn.

Optionally, the driving circuit is configured for providing driving signals for pixel circuits of a display panel; the driving method includes:

in the first half of the frame time, controlling, by the on/off control circuit under the control of the on/off control signal, the electric disconnection of the input ends of the multi-stage driving units, to control all of the driving units of the driving circuit to output the valid driving signals in turn:

in the second half of the frame time, controlling, by the on/off control circuit under the control of the on/off control signal, the electric disconnection of the input ends of the multi-stage driving units, to control the multi-stage driving units of the driving circuit to output the valid driving signals in turn.

Optionally, the driving circuit includes N-stage driving units, the N is a positive integer greater than 1, and the driving circuit further includes a forward scan control circuit; the driving method including: when the driving circuit is performing forward scan, controlling, by the forward scan control circuit under the control of a forward scan control signal, electric connection of a driving signal output end of an $n^{th}$-stage driving unit and an input end of an $(n+1)^{th}$ stage driving unit;

the n+1 is less than or equal to the N, and the n is a positive integer.

Optionally, the driving circuit includes N-stage driving units, the N being a positive integer greater than 1, and the driving circuit further includes a reverse scan control circuit;

the driving method further including: when the driving circuit is preforming reverse scan, controlling, by the reverse scan control circuit under the control of a reverse scan control signal, electric connection of an input end of an $n^{th}$-stage driving unit and a driving signal output end of an $(n+1)^{th}$ stage driving unit;

the n+1 is less than or equal to the N, and the n is a positive integer.

In a third aspect, the present disclosure provides in some embodiments a display device, including a plurality of rows and columns of pixel circuits and the above-mentioned driving circuit;

the driving circuit is configured for providing driving signals for the pixel circuits.

Optionally, the display device includes pixel circuits arranged in N rows and M columns, the N and the M being integers greater than 1; wherein a pixel circuit of an $a^{th}$ row and an $m^{th}$ column includes a data writing circuit of the $a^{th}$ row and the $m^{th}$ column, a light-emitting control circuit of the $a^{th}$ row and the $m^{th}$ column, a third energy storage circuit of the $a^{th}$ row and the $m^{th}$ column, a fourth energy storage circuit of the $a^{th}$ row and the $m^{th}$ column, a display driving circuit of the $a^{th}$ row and the $m^{th}$ column, and a light-emitting element of the $a^{th}$ row and the $m^{th}$ column, wherein the a is a positive integer less than or equal to N, and the m is a positive integer less than or equal to the M;

the data writing circuit of the $a^{th}$ row and the $m^{th}$ column is electrically connected to an $a^{th}$ driving signal output end, a data line of the $m^{th}$ column and a control end of the display driving circuit of the $a^{th}$ row and the $m^{th}$ column, and configured for controlling, under the control of the $a^{th}$ driving signal provided by the $a^{th}$ driving signal output end, electric connection of the data line of the $m^{th}$ column and the control end of the display driving circuit of the $a^{th}$ row and the $m^{th}$ column;

the light-emitting control circuit of the $a^{th}$ row and the $m^{th}$ column is electrically connected to an $a^{th}$ light-emitting control end, a power supply voltage end and a first end of the display driving circuit of the $a^{th}$ row and the $m^{th}$ column, and configured for controlling, under the control of an $a^{th}$ light-emitting control signal provided by the $a^{th}$ light-emitting control end, electric connection of the power supply voltage end and the first end of the display driving circuit of the $a^{th}$ row and the $m^{th}$ column;

a first end of the third energy storage circuit of the $a^{th}$ row and the $m^{th}$ column is electrically connected to the control end of the display driving circuit of the $a^{th}$ row and the $m^{th}$ column, a second end of the third energy storage circuit of the $a^{th}$ row and the $m^{th}$ column is electrically connected to the first end of the display driving circuit of the $a^{th}$ row and the $m^{th}$ column, and the third energy storage circuit of the $a^{th}$ row and the $m^{th}$ column is configured for storing electric energy;

a first end of the fourth energy storage circuit of the $a^{th}$ row and the $m^{th}$ column is electrically connected to the first end of the display driving circuit of the $a^{th}$ row and the $m^{th}$ column, a second end of the fourth energy storage circuit of the $a^{th}$ row and the $m^{th}$ column is electrically connected to the power supply voltage end, and the fourth energy storage circuit of the $a^{th}$ row and the $m^{th}$ column is configured for storing electric energy;

the display driving circuit of the $a^{th}$ row and the $m^{th}$ column is electrically connected to the light-emitting element of the $a^{th}$ row and the $m^{th}$ column, and configured for driving, under the control of a potential of the control end of the display driving circuit of the $a^{th}$ row and the $m^{th}$ column, the light-emitting element of the $a^{th}$ row and the $m^{th}$ column to emit light;

an $a^{th}$-stage driving unit of the driving circuit is configured for providing the $a^{th}$ driving signal to the $a^{th}$ driving signal output end.

Optionally, the pixel circuit of the $a^{th}$ row and the $m^{th}$ column includes a setting circuit of the $a^{th}$ row and the $m^{th}$ column; the display driving circuit of the $a^{th}$ row and the $m^{th}$ column is electrically connected to a first electrode of the light-emitting element of the $a^{th}$ row and the $m^{th}$ column, and a second electrode of the light-emitting element of the $a^{th}$ row and the $m^{th}$ column is electrically connected to a third voltage end;

the setting circuit of the $a^{th}$ row and the $m^{th}$ column is electrically connected to an $a^{th}$ setting control end, the first electrode of the light-emitting element of the $a^{th}$ row and the $m^{th}$ column, and a setting voltage end, and configured for controlling, under the control of an $a^{th}$ setting control signal provided by the $a^{th}$ setting control end, the setting voltage end to provide a setting voltage to the first electrode of the light-emitting element of the $a^{th}$ row and the $m^{th}$ column.

In a fourth aspect, the present disclosure provides in some embodiments provides a display control method performed by the above-mentioned display device, wherein the second half of the frame time includes N data writing phases, and the display control method includes:

in the first half of the frame time, outputting, by each of the driving units of the driving circuit, a valid driving signal, providing, by data lines of the M columns, initial voltages, and providing, by data writing circuits of the N rows and the M columns under the control of driving signals provided by respective driving signal output ends, the initial voltages to control ends of display driving circuits arranged in the N rows and the M columns;

in an $a^{th}$ data writing phase, providing, by the data line of the $m^{th}$ column, a respective data voltage, and controlling, by a data writing circuit of an $a^{th}$ row and an $m^{th}$ column under the control of an $a^{th}$ driving signal provided by an $a^{th}$ driving signal output end, electric connection of the data line of the $m^{th}$ column and a control end of the display driving circuit of the $a^{th}$ row and the $m^{th}$ column.

DETAILED DESCRIPTION

Figure 1:
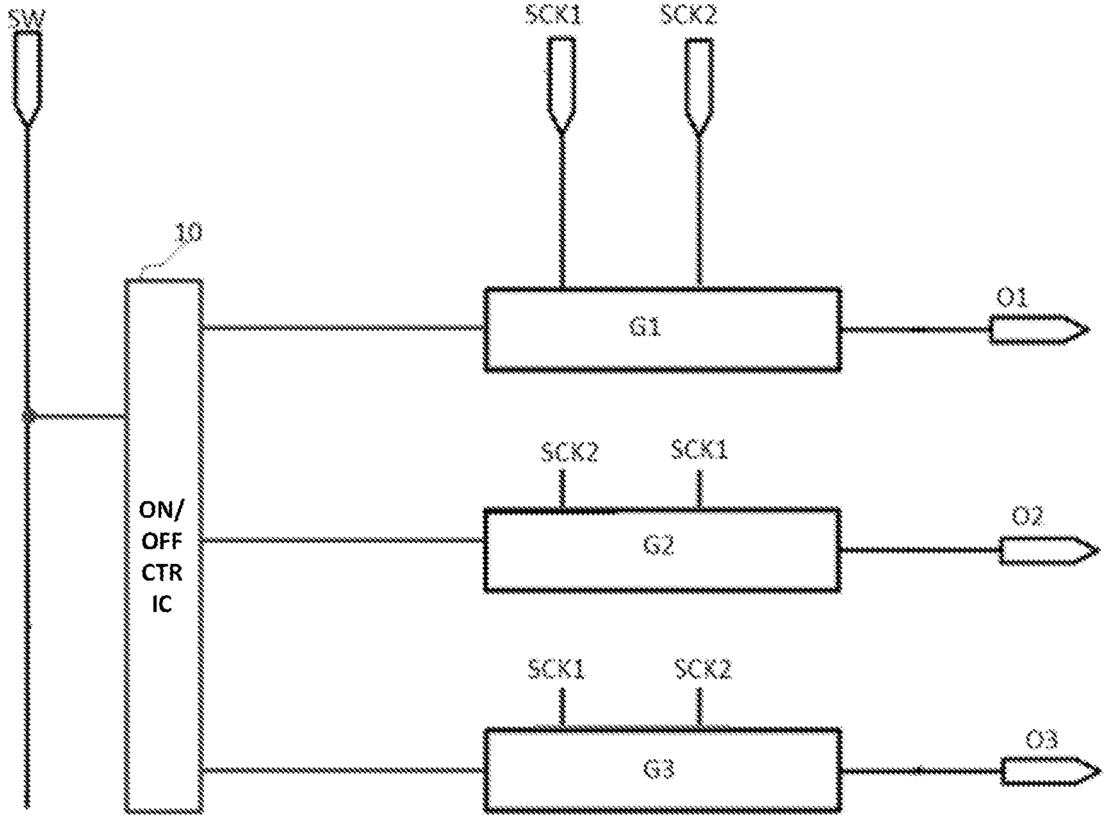
FIG. 1 is a block diagram of a driving circuit according to at least one embodiment of the present disclosure.

The technical solution in the embodiments of the present disclosure will be described clearly and completely in combination with the drawings in the embodiments of the present disclosure. Obviously, the described embodiments are only part of the embodiments of the present disclosure, rather than all of them. Based on the embodiments in the present disclosure, all other embodiments obtained by those skilled in the art without creative work shall also fall within the scope of protection of the present disclosure.

All of the transistors used in all embodiments of the present disclosure may be triodes, thin film transistors or field effect transistors or other devices with the same characteristics. In embodiments of the present disclosure, to distinguish between two electrodes of a transistor other than a control electrode, one of the electrodes is referred to as a first electrode and the other electrode is referred to as a second electrode.

In practical operation, when the transistor is a triode, the control electrode may be a base electrode, the first electrode may be a collector electrode, and the second electrode may be an emitter electrode; alternatively, the control electrode may be a base electrode, the first electrode may be an emitter electrode, and the second electrode may be a collector electrode.

In practical operation, when the transistor is a thin film transistor or a field effect transistor, the control electrode may be a gate electrode, the first electrode may be a drain electrode, and the second electrode may be a source electrode; alternatively, the control electrode may be a gate electrode, the first electrode may be a source electrode, and the second electrode may be a drain electrode.

The driving circuit according to the embodiment of the present disclosure includes multi-stage driving units and an on/off control circuit;

- each of the driving units includes an input end and a driving signal output end, and each of the driving units is configured for outputting a corresponding driving signal via the driving signal output end according to an input signal provided by the input end;
- the input end included in a first-stage driving unit is electrically connected to a start signal end;
- the on/off control circuit is electrically connected to an on/off control end and input ends included in the multi-stage driving units, and configured for controlling the electric connection or electric disconnection of the input ends included in the multi-stage driving units under the control of an on/off control signal provided by the on/off control end, to control the multi-stage driving units to output valid driving signals in a first half of a frame time, and control the multi-stage driving units to output the valid driving signals in turn in the second half of the frame time.

In the embodiments of the present disclosure, when the driving circuit operates, all of the multi-stage driving units are controlled to output the valid driving signals in a first half of a frame time so that the plurality of rows of pixel circuit can access an initial voltage, and the multi-stage driving units are controlled to sequentially output valid driving signal in the second half of the frame time so that the plurality of rows of pixel circuits can sequentially access corresponding data voltages; as a result, when the initial voltage and the data voltage need to be sequentially inputted to a pixel circuit within the same frame time, the time periods of the plurality of rows of pixel circuits for accessing the respective data voltages do not overlap each other, and the pixel circuit may operate properly.

In at least one embodiment of the present disclosure, controlling the multi-stage driving units to output the valid driving signals in the first half of the frame time may refer to that:

- in a first output stage included in a first half of a frame time, all of the multi-stage driving units output the valid driving signals simultaneously; or
- in the first half of the frame time, all of the multi-stage driving units sequentially output valid driving signals in turn, but the present disclosure is not limited thereto.

In at least one embodiment of the present disclosure, a frame time may include a first stage and a second stage arranged sequentially in that order, a first half of the frame time may be the first stage, and a second half of the frame time may be the second stage:

- the period of the first phase may be equal to the period of the second phase; or the period of the first phase may be greater than the period of the second phase; or the period of the first phase may be less than the period of the second phase.

In at least one embodiment of the present disclosure, the valid signal is a low voltage signal when the transistor of the pixel circuit into which the driving signal is inputted is a p-type transistor; and the valid signal is a high voltage signal when the transistor of the pixel circuit into which the driving signal is inputted is an n-type transistor; the present disclosure is not limited thereto.

In the above former case, when the driving circuit operates according to the embodiment of the present disclosure,

- the driving circuit is configured for providing a driving signal to a pixel circuit included in a display panel; the second half of a frame time may include a first input stage and a first output stage which are arranged sequentially in that order;
- in the first input stage, the electric connection between the input ends included in the multi-stage driving units is controlled by the on/off control circuit under the control of the on/off control signal;
- in the first output stage, each of the driving units included in the driving circuit outputs the valid driving signals to turn on the respective transistor in the pixel circuit so that the initial voltage is inputted into the respective transistor in the pixel circuit;
- in the second half of the frame time, the electric disconnection between the input ends included in the multi-stage driving units is controlled by the on/off control circuit under the control of the on/off control signal to control all of the multi-stage driving units included in the driving circuit to output the valid driving signals in turn, so that the access corresponding data voltages are inputted into respective transistors in the plurality of rows of pixel circuits in turn.

When the driving circuit according to an embodiment of the present disclosure is operating, in a first output stage, the initial voltage is inputted into all of the corresponding transistors in the pixel circuit, and in the second half of a frame time, the corresponding data voltages are inputted into respective transistors in a plurality of rows of pixel circuits in turn, so that when the initial voltage and the data voltage need to be sequentially inputted to the pixel circuit within the same frame time, the time periods of the plurality of rows of pixel circuits for accessing the respective data voltages do not overlap each other, and the pixel circuit may operate properly.

In the above latter case, when the driving circuit according to an embodiment of the present disclosure operates, the driving circuit is configured for providing driving signals for pixel circuits included in a display panel;

in the first half of the frame time, the electric disconnection between the input ends included in the multi-stage driving units is controlled by the on/off control circuit under the control of the on/off control signal so as to control all of the driving units included in the driving circuit to output the valid driving signals in turn, so that corresponding transistors in a plurality of rows of pixel circuits sequentially access the initial voltage;

in the second half of a frame time, the electric disconnection between the input ends included in the multi-stage driving units is controlled by the on/off control circuit under the control of the on/off control signal so as to control the multi-stage driving units included in the driving circuit to output the valid driving signals in turn, so that corresponding transistors in the plurality of rows of pixel circuits sequentially access corresponding data voltages.

When the driving circuit according to an embodiment of the present disclosure operates, in a first half of a frame time, corresponding transistors in a plurality of rows of pixel circuits access an initial voltage sequentially, and in the second half of a frame time, corresponding transistors in a plurality of rows of pixel circuits access corresponding data voltages sequentially, so that when the initial voltage and the data voltage need to be sequentially inputted to a pixel circuit within the same frame time, the time periods of the plurality of rows of pixel circuits for accessing the respective data voltages do not overlap each other, and the pixel circuit may operate properly.

As shown in FIG. 1, the driving circuit of the embodiment of the present disclosure may include a first-stage driving unit G1, a second-stage driving unit G2, a third-stage driving unit G3 and an on/off control circuit 10;

the first-stage driving unit G1 includes a first input end and a first driving signal output end O1;

the second-stage driving unit G2 includes a second input end and a second driving signal output end O2;

the third-stage driving unit G3 includes a third input end and a third driving signal output end O3;

the first-stage driving unit G1 is configured for outputting a corresponding driving signal via the first driving signal output end O1 according to an input signal provided by the first input end;

the second-stage driving unit G2 is configured for outputting a corresponding driving signal via the second driving signal output end O2 according to an input signal provided by the second input end;

the third-stage driving unit G3 is configured for outputting a corresponding driving signal via the third driving signal output end O3 according to an input signal provided by the third input end;

an input end included in the first-stage driving unit G1 is electrically connected to a start signal end;

the on/off control circuit 10 is electrically connected to an on/off control end SW, an input end included in the first-stage driving unit G1, an input end included in the second-stage driving unit G2 and an input end included in the third-stage driving unit G3, and configured for controlling the on/off of the input end included in the first-stage driving unit G1, the input end included in the second-stage driving unit G2 and the input end included in the third-stage driving unit G3 under the control of an on/off control signal provided by the on/off control end SW.

In at least one embodiment of the present disclosure, the first-stage driving unit G1 includes an input end being as the first input end, the second-stage driving unit G2 includes an input end being as the second input end, and the third-stage driving unit G3 includes an input end being as the third input end.

In at least one embodiment of FIGS. 1-4, a first-stage driving unit G1 is electrically connected to a first clock signal end SCK1 and a second clock signal end SCK2, a second-stage driving unit G2 is electrically connected to a second clock signal end SCK2 and a first clock signal end SCK1, and a third-stage driving unit G3 is electrically connected to a first clock signal end SCK1 and a second clock signal end SCK2.

In at least one embodiment of the present disclosure, the driving circuit includes N-stage driving units, and the N is a positive integer greater than 1: the driving circuit further includes a forward scan control circuit;

the forward scan control circuit is electrically connected to a forward scan control end, the driving signal output end included in an $n^{th}$-stage driving unit and the input end included in an $(n+1)^{th}$-stage driving unit, and configured for controlling electric connection between the driving signal output end included in the $n^{th}$-stage driving unit and the input end included in the $(n+1)^{th}$-stage driving unit under the control of a forward scan control signal provided by the forward scan control end;

the n+1 is less than or equal to the N, and the n is a positive integer.

In specific implementations, the driving circuit may further include a forward scan control circuit which, under the control of a forward scan control signal, controls electric connection between a driving signal output end included by the $n^{th}$-stage driving unit and an input end included by the $(n+1)^{th}$ driving unit to enable forward scan.

Figure 2:
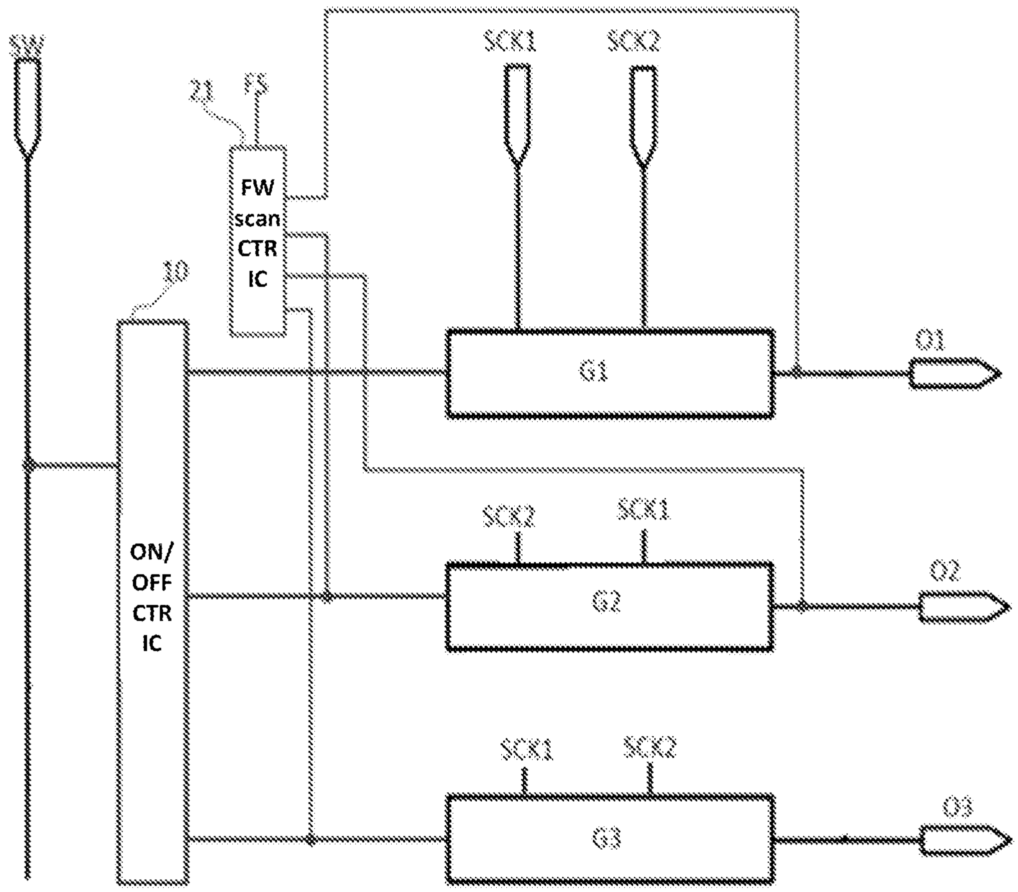
FIG. 2 is a block diagram of a driving circuit according to at least one embodiment of the present disclosure.

As shown in FIG. 2, based on at least one embodiment of the driving circuit shown in FIG. 1, the driving circuit further includes a forward scan control circuit 21;

the forward scan control circuit 21 is electrically connected to a forward scan control end FS, a first driving signal output end O1, an input end included in the second-stage driving unit G2, a second driving signal output end O2 and an input end included in the third-stage driving unit G3, and configured for controlling electric connection between the first driving signal output end O1 and the input end included in the second-stage driving unit G2, and controlling electric connection between the second driving signal output end O2 and the input end included in the third-stage driving unit G3 under the control of a forward scan control signal provided by the forward scan control end FS. In at least one embodiment of the present disclosure, the driving circuit includes N-stage driving units, and the N is a positive integer greater than 1; the driving circuit further includes a reverse scan control circuit;

the reverse scan control circuit is electrically connected to a reverse scan control end, the input end included in the nu-stage driving unit and the driving signal output end included in the $(n+1)^{th}$-stage driving unit, and configured for controlling electric connection between the input end included in the $n^{th}$-stage driving unit and the driving signal output end included in the $(n+1)^{th}$-stage driving unit under the control of a reverse scan control signal provided by the reverse scan control end;

the n+1 is less than or equal to the N, and the n is a positive integer.

In specific implementations, the driving circuit may further include a reverse scan control circuit to control, under the control of a reverse scan control signal, electric connection between a driving signal output end included by the $(n+1)^{th}$-stage driving unit and an input end included by the $(n+1)^{th}$ stage driving unit to enable the reverse scan.

Figure 3:
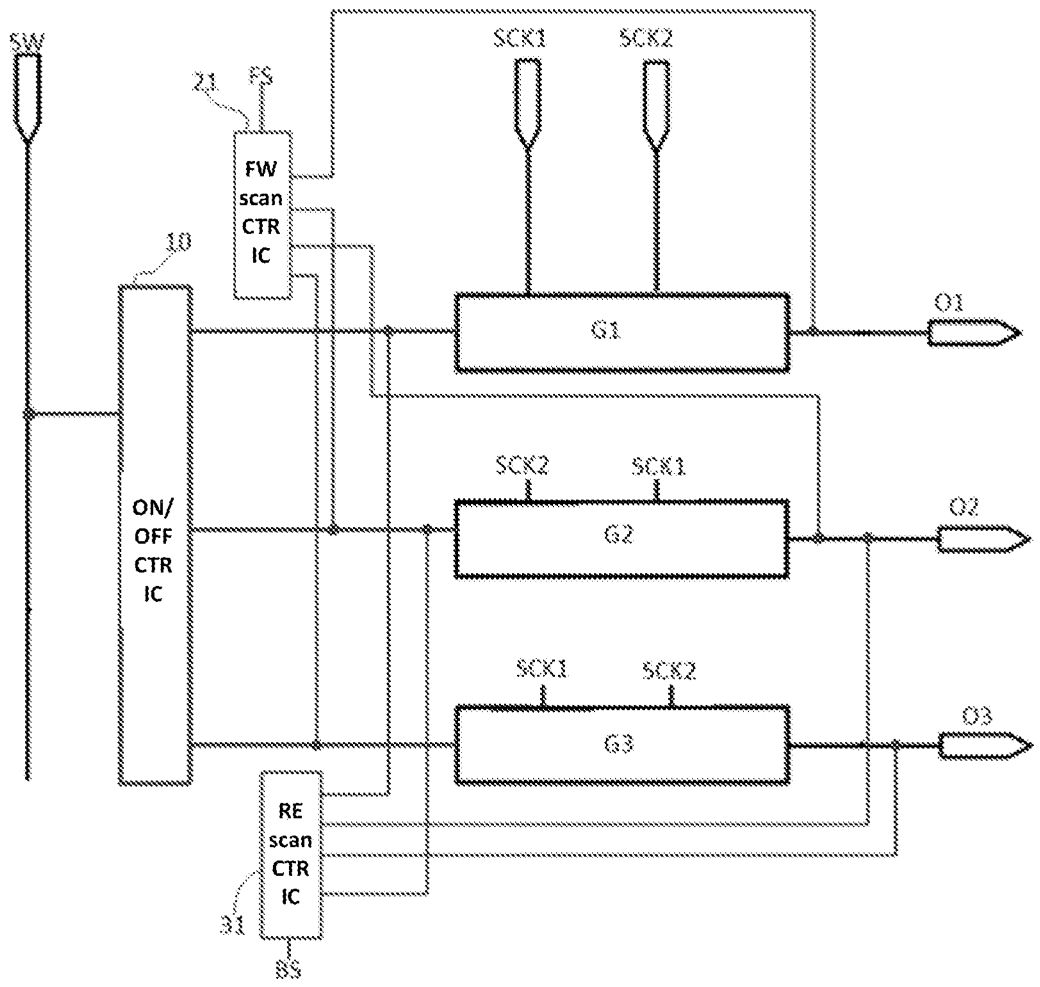
FIG. 3 is a block diagram of a driving circuit according to at least one embodiment of the present disclosure.

As shown in FIG. 3, based on at least one embodiment of the driving circuit shown in FIG. 2, the driving circuit according to at least one embodiment of the present disclosure further includes a reverse scan control circuit 31;

the reverse scan control circuit 31 is electrically connected to the reverse scan control end BS, the input end included in the first-stage driving unit G1 and the second driving signal output end O2, and configured for controlling electric connection between the input end included in the first-stage driving unit G1 and the second driving signal output end O2 under the control of the reverse scan control signal provided by the reverse scan control end BS, and controlling electric connection between the input end included in the second-stage driving unit G2 and the third driving signal output end O3 to enable reverse scan.

In at least one embodiment of the present disclosure, the driving circuit includes N-stage driving units, where the N is a positive integer greater than 1; the on/off control circuit includes N−1 on/off control transistors;

a control electrode of an $n^{th}$ on/off control transistor is electrically connected to the on/off control end, a first electrode of the $n^{th}$ on/off control transistor is electrically connected to the input end included in an $n^{th}$-stage driving unit, and a second electrode of the $n^{th}$ on/off control transistor is electrically connected to the input end included in an $(n+1)^{th}$-stage driving unit;

the n+1 is less than or equal to the N, and the n is a positive integer.

Optionally, the N−1 on/off control transistors are all n-type transistors, or the N−1 on/off control transistors are all p-type transistors.

Optionally, the forward scan control circuit includes N−1 forward scan control transistors;

a control electrode of an $n^{th}$ forward scan control transistor is electrically connected to the forward scan control end, a first electrode of the $n^{th}$ forward scan control transistor is electrically connected to the driving signal output end included in the $n^{th}$-stage driving unit, and a second electrode of the $n^{th}$ forward scan control transistor is electrically connected to the input end included in the $(n+1)^{th}$-stage driving unit.

Optionally, the N−1 forward scan control transistors are all n-type transistors or the N−1 forward scan control transistors are all p-type transistors.

In at least one embodiment of the present disclosure, the reverse scan control circuit includes N−1 reverse scan control transistors:

a control electrode of an $n^{th}$ reverse scan control transistor is electrically connected to the reverse scan control end, a first electrode of the $n^{th}$ reverse scan control transistor is electrically connected to the input end included in the $n^{th}$-stage driving unit, and a second electrode of the $n^{th}$ reverse scan control transistor is electrically connected to the driving signal output end included in the $(n+1)^{th}$-stage driving unit.

Optionally, the N−1 reverse scan control transistors are all n-type transistors, or the N−1 reverse scan control transistors are all p-type transistors.

Figure 4:
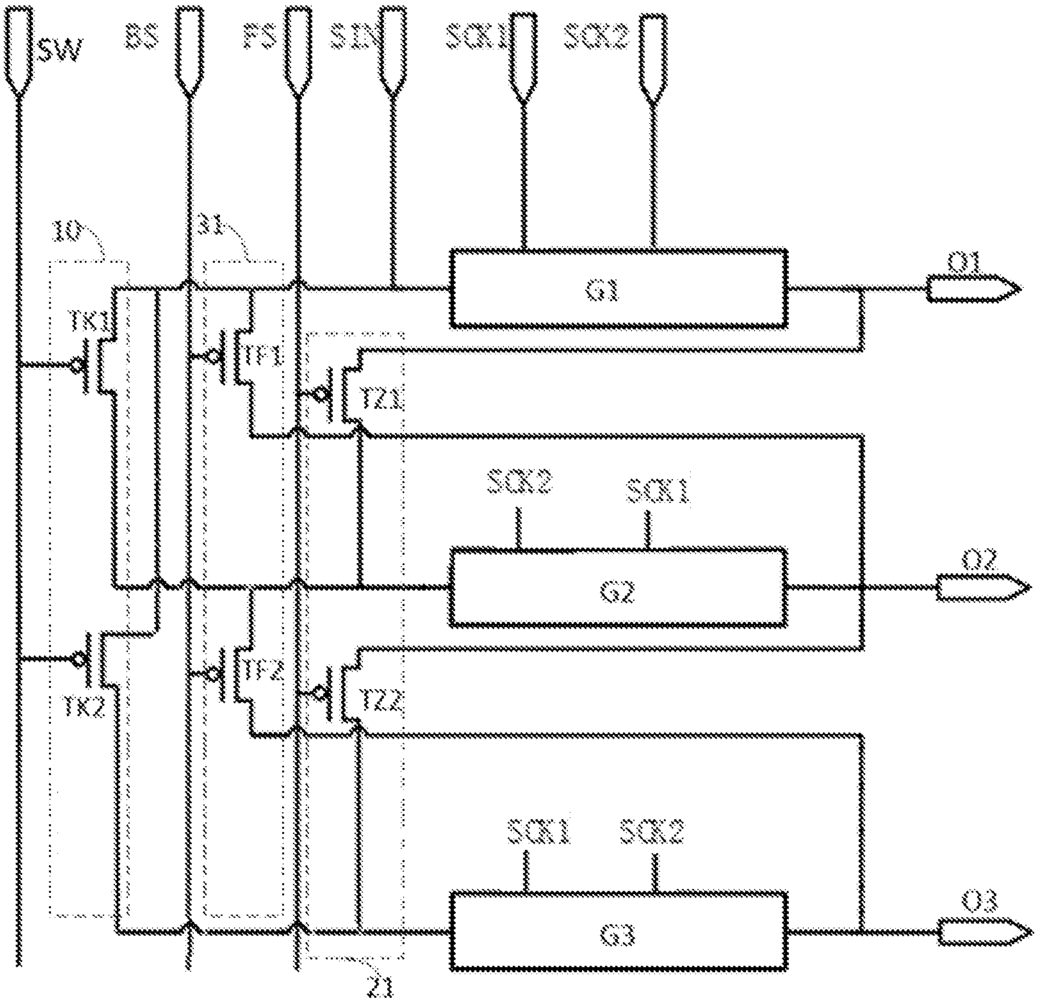
FIG. 4 is a circuit diagram of a driving circuit according to at least one embodiment of the present disclosure.

As shown in FIG. 4, in at least one embodiment of the driving circuit shown in FIG. 3, the on/off control circuit 10 includes a first on/off control transistor TK1 and a second on/off control transistor TK2;

a gate electrode of the first on/off control transistor TK1 is electrically connected to the on/off control end SW, a source electrode of the first on/off control transistor TK1 is electrically connected to an input end included in the first-stage driving unit G1, and a drain electrode of the first on/off control transistor TK1 is electrically connected to an input end included in the second-stage driving unit G2;

a gate electrode of the second on/off control transistor TK2 is electrically connected to the on/off control end SW, a source electrode of the second on/off control transistor TK2 is electrically connected to the input end included in the first-stage driving unit G1, and a drain electrode of the second on/off control transistor TK2 is electrically connected to an input end included in the third-stage driving unit G3;

the forward scan control circuit 21 includes a first forward scan control transistor TZ1 and two forward scan control transistors TZ2;

the gate electrode of the first forward scan control transistor TZ1 is electrically connected to the forward scan control end FS, a source electrode of the first forward scan control transistor TZ1 is electrically connected to the first driving signal output end O1, and a drain electrode of the first forward scan control transistor TZ1 is electrically connected to an input end included in the second-stage driving unit G2;

a gate electrode of the second forward scan control transistor TZ2 is electrically connected to the forward scan control end FS, a source electrode of the second forward scan control transistor TZ2 is electrically connected to the second driving signal output end O2, and a drain electrode of the second forward scan control transistor TZ2 is electrically connected to an input end included in the third-stage driving unit G3;

the reverse scan control circuit 31 includes a first reverse scan control transistor TF1 and a second reverse scan control transistor TF2;

a gate electrode of a first reverse scan control transistor TF1 is electrically connected to the reverse scan control end BS, a source electrode of the first reverse scan control transistor TF1 is electrically connected to an input end included in the first-stage driving unit G1, and a drain electrode of the first reverse scan control transistor TF1 is electrically connected to the second driving signal output end O2;

a gate electrode of the second reverse scan control transistor TF2 is electrically connected to the reverse scan control end BS, a source electrode of the second reverse scan control transistor TF2 is electrically connected to an input end included in the second-stage driving unit G2, and a drain electrode of the second reverse scan control transistor TF2 is electrically connected to the third driving signal output end O3.

In at least one embodiment of the driving circuit shown in FIG. 4, TK1, TK2, TF1, TF2, TZ1 and TZ2 may all be p-type transistors, but the present disclosure is not limited thereto.

Figure 5:
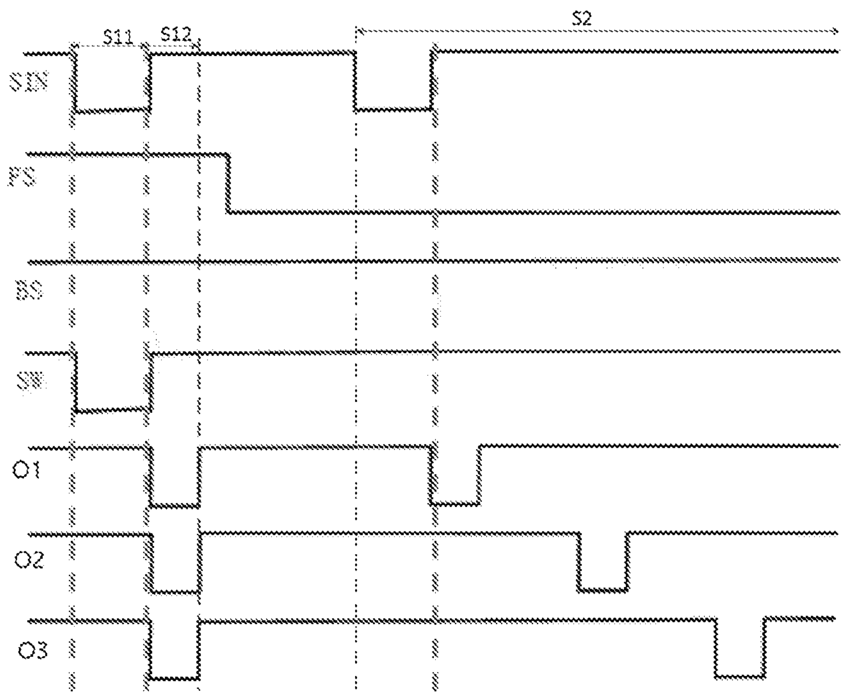
FIG. 5 is an operational timing diagram of at least one embodiment of the driving circuit shown in FIG. 4.

As shown in FIG. 5, in operation of at least one embodiment of the driving circuit shown in FIG. 4 of the present disclosure, a first half of a frame time includes a first input stage S11 and a first output stage S12 arranged sequentially in that order;

in the first input stage S11, the SIN provides a low voltage signal, the FS and the BS provide a high voltage signal, the SW provides a low voltage signal, the TZ1, the TZ2, the TF1 and the TF2 are all turned off, and the TK1 and the TK2 are turned on, so as to control electric connection between an input end included in the first-stage driving unit G1, an input end included in the second-stage driving unit G2 and an input end included in the third-stage driving unit G3;

in the first output stage S12, the SIN provides a high voltage signal, the FS and the BS both provide a high voltage signal, the SW provides a high voltage signal, the TZ1, the TZ2, the TF1 and the TF2 are all turned off, the TK1 and the TK2 are turned off, and the first-stage driving unit G1, the second-stage driving unit G2 and the third-stage driving unit G3 all output a low voltage signal so as to turn on a corresponding transistor in the pixel circuit;

in the second half S2 of a frame time, FS provides a low voltage signal, BS provides a high voltage signal, SW provides a high voltage signal, TZ1 and TZ2 are turned on, TF1, TF2, TK1 and TK2 are all turned off, O1 is electrically connected to an input end of G2, O2 is electrically connected to an input end of G3, an input end included in a first-stage driving unit G1, an input end included in a second-stage driving unit G2 and an input end included in a third-stage driving unit G3 are turned off, and the first-stage driving unit G1, the second-stage driving unit G2 and the third-stage driving unit G3 sequentially output a low voltage signal.

In at least one embodiment of the present disclosure, each of the driving units includes a first node control circuit, a second node control circuit, a first energy storage circuit, a second energy storage circuit, and an output circuit;

the first node control circuit is electrically connected to a first clock signal end, an input end, a first node, a second clock signal end, a second node and a first voltage end, and configured for controlling electric connection between the first node and the input end under the control of a first clock signal provided by the first clock signal end, and controlling electric connection between the first node and the first voltage end under the control of a second clock signal provided by the second clock signal end and a potential of the second node;

the second node control circuit is electrically connected to the first node, the second node, the first clock signal end and the second voltage end, and configured for controlling electric connection between the second node and the first clock signal end under the control of a potential of the first node, and controlling electric connection between the second node and the second voltage end under the control of the first clock signal;

the first energy storage circuit is electrically connected to the first node, and configured for storing electrical energy;

the second energy storage circuit is electrically connected to the second node, and configured for storing electrical energy;

the output circuit is electrically connected to the first node, the second node, the first voltage end, the second clock signal end and the driving signal output end, and configured for controlling electric connection between the driving signal output end and the second clock signal end under the control of the potential of the first node, and controlling electric connection between the driving signal output end and the first voltage end under the control of the potential of the second node.

In at least one embodiment of the present disclosure, each of the driving units includes a first node control circuit, a second node control circuit, an output control node control circuit, a first energy storage circuit, a second energy storage circuit, and an output circuit;

the first node control circuit is electrically connected to a first clock signal end, an input end, a first node, a second clock signal end, a second node and a first voltage end, and configured for controlling electric connection between the first node and the input end under the control of a first clock signal provided by the first clock signal end, and controlling electric connection between the first node and the first voltage end under the control of a second clock signal provided by the second clock signal end and a potential of the second node;

the second node control circuit is electrically connected to the first node, the second node, the first clock signal end and the second voltage end, and configured for controlling electric connection between the second node and the first clock signal end under the control of a potential of the first node, and controlling electric connection between the second node and the second voltage end under the control of the first clock signal;

the output control node control circuit is electrically connected to the second voltage end, the first node and the output control node, and configured for controlling electric connection between the first node and the output control node under the control of a second voltage signal provided by the second voltage end;

the first energy storage circuit is electrically connected to the output control node, and configured for storing electrical energy;

the second energy storage circuit is electrically connected to the second node, and configured for storing electrical energy;

the output circuit is electrically connected to the output control node, the second node, the first voltage end, the second clock signal end and the driving signal output end, and configured for controlling electric connection between the driving signal output end and the second clock signal end under the control of a potential of the output control node, and controlling electric connection between the driving signal output end and the first voltage end under the control of the potential of the second node.

Optionally, the first voltage end may be a high voltage end and the second voltage end may be a low voltage end, but the present disclosure is not limited to.

Figure 6:
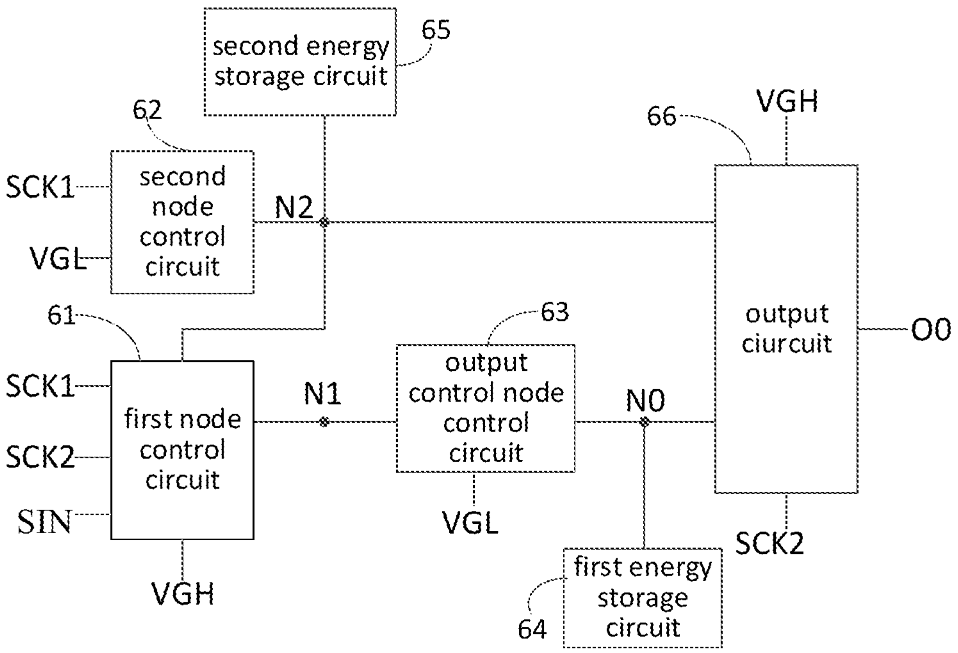
FIG. 6 is a block diagram of at least one embodiment of a driving unit included in a driving circuit according to the present disclosure.

As shown in FIG. 6, in at least one embodiment, the driving unit may include a first node control circuit 61, a second node control circuit 62, an output control node control circuit 63, a first energy storage circuit 64, a second energy storage circuit 65, and an output circuit 66:

the first node control circuit 61 is electrically connected to a first clock signal end SCK1, an input end SIN, a first node N1, a second clock signal end SCK2, a second node N2 and a high voltage end VGH, and configured for controlling electric connection between the first node N1 and the input end SIN under the control of a first clock signal provided by the first clock signal end SCK1, and controlling electric connection between the first node N1 and the high voltage end VGH under the control of a second clock signal provided by the second clock signal end SCK2 and the potential of the second node N2;

the second node control circuit 62 is electrically connected to the first node N1, the second node N2, the first clock signal end SCK1 and the low voltage end VGL, and configured for controlling electric connection between the second node N2 and the first clock signal end SCK1 under the control of the potential of the first node N1, and controlling electric connection between the second node N2 and the low voltage end VGL under the control of the first clock signal;

the output control node control circuit 63 is electrically connected to the low voltage end VGL, the first node N1 and an output control node N0, and configured for controlling electric connection between the first node N1 and the output control node N0 under the control of a low voltage signal provided by the low voltage end VGL;

the first energy storage circuit 64 is electrically connected to the output control node N0, and configured for storing electric energy;

the second energy storage circuit 65 is electrically connected to the second node N2, and configured for storing electric energy;

the output circuit 66 is electrically connected to the output control node N0, the second node N2, a high voltage end VGH, a second clock signal end SCK2 and a driving signal output end O0, and configured for controlling electric connection between the driving signal output end O0 and the second clock signal end SCK2 under the control of the potential of the output control node N0, and controlling electric connection between the driving signal output end O0 and the high voltage end VGH under the control of the potential of the second node N2.

Figure 7:
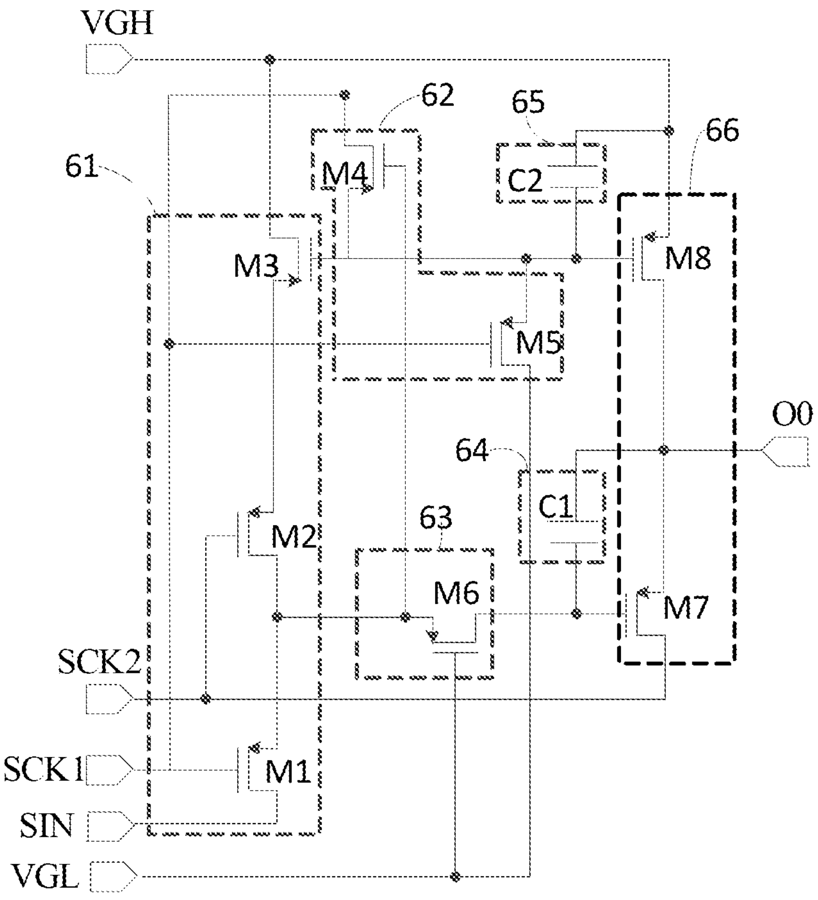
FIG. 7 is a circuit diagram of at least one embodiment of the driving unit.

As shown in FIG. 7, based on at least one embodiment of the driving circuit shown in FIG. 6, the first node control circuit 61 includes a first transistor M1, a second transistor M2 and a third transistor M3;

the gate electrode of the first transistor M1 is electrically connected to the first clock signal end SCK1, the source electrode of the first transistor M1 is electrically connected to the input end SIN, and the drain electrode of the first transistor M1 is electrically connected to the first node N1;

the gate electrode of the second transistor M2 is electrically connected to the second clock signal end SCK2, the source electrode of the second transistor M2 is electrically connected to the first node N1, the drain electrode of the second transistor M2 is electrically connected to the drain electrode of the third transistor M3, and the source electrode of the third transistor M3 is electrically connected to the high voltage end VGH;

the second node control circuit 62 includes a fourth transistor M4 and a fifth transistor M5;

the gate electrode of the fourth transistor M4 is electrically connected to the second node, the source electrode of the fourth transistor M4 is electrically connected to the first clock signal end SCK1, and the drain electrode of the fourth transistor M4 is electrically connected to the second node N2;

the gate electrode of the fifth transistor M5 is electrically connected to the first clock signal end SCK1, the source electrode of the fifth transistor M5 is electrically connected to the low voltage end VGL, and the drain electrode of the fifth transistor M5 is electrically connected to the second node N2;

the output control node control circuit 63 includes a sixth transistor M6; the gate electrode of the sixth transistor M6 is electrically connected to the low voltage end VGL, the source electrode of the sixth transistor T6 is electrically connected to the output control node N0, and the drain electrode of the sixth transistor T6 is electrically connected to the first node N1;

the first energy storage circuit 64 includes a first capacitor C1, and the second energy storage circuit 65 includes a second capacitor C2;

a first end of C1 is electrically connected to an output control node N0, and a second end of C1 is electrically connected to the driving signal output end O0;

a first end of C2 is electrically connected to the second node N2, and a second end of C2 is electrically connected to a high voltage end VGH;

the output circuit 66 includes a seventh transistor M7 and an eighth transistor M8;

the gate electrode of the M7 is electrically connected to the output control node N0, the source electrode of the M7 is electrically connected to the second clock signal end SCK2, and the drain electrode of the M7 is electrically connected to the driving signal output end O0;

the gate electrode of M8 is electrically connected to the second node N2, the source electrode of M8 is electrically connected to the driving signal output end O0, and the drain electrode of M8 is electrically connected to the high voltage end VGH.

In at least one embodiment shown in FIG. 7, all transistors are p-type transistors, but the present disclosure is not limited thereto.

Figure 8:
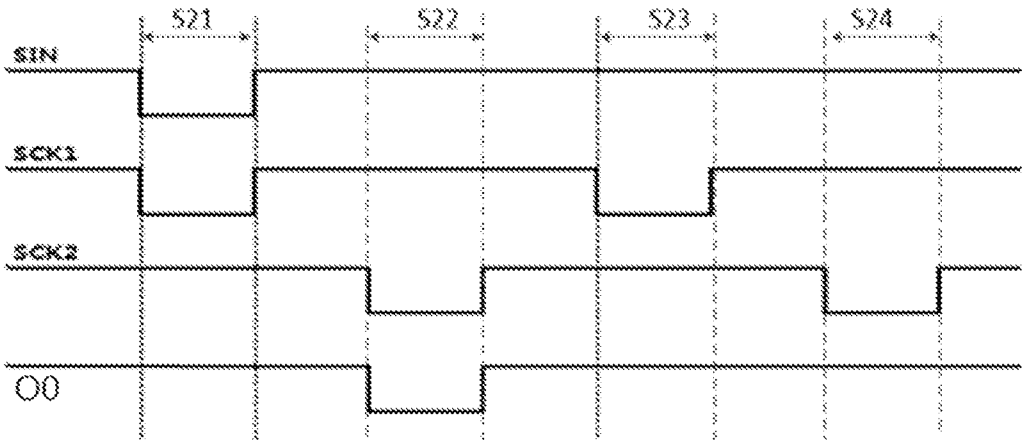
FIG. 8 is an operational timing diagram of at least one embodiment of the driving unit shown in FIG. 7.

As shown in FIG. 8, during the operation of the driving circuit shown in FIG. 7 of at least one embodiment the present disclosure, the second half of the frame time includes a second input stage S21, a second output stage S22, a second output reset stage S23 and a third output reset stage S24 which are arranged sequentially in that order;

in a first input stage S11, the SIN provides a low voltage signal, the SCK1 provides a low voltage signal, the SCK2 provides a high voltage signal, the M5 is turned on, the potential of the N2 is a low voltage, the M8 is turned on, the M1 is turned on, and the M6 is turned on, so as to change the potential of the N1 and the potential of the N0 into a low voltage, the M7 is turned on, and the O0 outputs a high voltage signal;

in a first output stage S12, the SIN provides a high voltage signal, the SCK1 provides a high voltage signal, the SCK2 provides a low voltage signal, M2 is turned on, M4 is turned on, M6 is turned on, the potential of N2 becomes a high voltage, the potential of N1 and the potential of N0 are maintained at a low voltage, M7 is turned on, and O0 outputs a low voltage signal;

in a second output reset stage S23, the SIN provides a high voltage signal, the SCK1 provides a low voltage signal, the SCK2 provides a high voltage signal, M1 and M6 are turned on to enable the potential of the potential of N0 and the potential of N1 at a high voltage, M5 is turned on to enable the potential of N2 at a low voltage, M8 is turned on, M7 is turned off, and O0 outputs a high voltage signal;

in the third output reset stage S24, SIN provides a high voltage signal, SCK1 provides a high voltage signal, SCK2 provides a low voltage signal, M2 is turned on, the potential of N2 is maintained as a low voltage, M3 is turned on, M6 is turned on, the potential of N0 and the potential of N1 are voltages, M8 is turned on, and O0 outputs a high voltage signal.

The present disclosure provides in some embodiments a TA driving method, which is performed by the above-mentioned driving circuit, and includes the following step:

controlling, by the on/off control circuit under the control of the on/off control signal, the electric connection or the electric disconnection of the input ends of the multi-stage driving units, to control all of driving units of the driving circuit to output the valid driving signals in the first half of the frame time, and control the multi-stage driving units to output the valid driving signals in turn in the second half of the frame time.

In the driving method according to some embodiments of the present disclosure, the multi-stage driving units are controlled to output valid driving signals in a first half of a frame time so that the plurality of rows of pixel circuit can access an initial voltage, and the multi-stage driving units are controlled to sequentially output valid driving signals in turn in the second half of the frame time so that the plurality of rows of pixel circuits can sequentially access corresponding data voltages; accordingly, when the initial voltage and the data voltage need to be sequentially inputted to the pixel circuit within the same frame time, the time periods of the plurality of rows of pixel circuits for accessing the respective data voltages do not overlap each other, and the pixel circuit may operate properly.

In at least one embodiment of the present disclosure, the driving circuit is configured for providing driving signals for pixel circuits included in a display panel, and the first half of the frame time includes a first input stage and a first output stage arranged sequentially in that order. The driving method includes the following steps:

in the first input stage, the electric connection between the input ends included in the multi-stage driving units is controlled by the on/off control circuit under the control of the on/off control signal;

in the first output stage, the multi-stage driving units included in the driving circuit all output valid driving signals so that the corresponding transistors in the pixel circuit are supplied with the initial voltage;

in the second half of a frame time, the electric disconnection between the input ends included in the multi-stage driving units is controlled by the on/off control circuit under the control of the on/off control signal, so as to control the multi-stage driving units included in the driving circuit to output the valid driving signals in turn, so that corresponding transistors in the plurality of rows of pixel circuits are supplied with respective data voltages in turn.

In at least one embodiment of the present disclosure, the driving circuit is configured for providing driving signals for pixel circuits included in a display panel. The driving method includes the following steps:

in the first half of the frame time, the electric disconnection between the input ends included in the multi-stage driving units is controlled by the on/off control circuit under the control of the on/off control signal, so as to control all of the driving units included in the driving circuit to output the valid driving signals in turn, and thus corresponding transistors in a plurality of rows of pixel circuits are supplied with the initial voltage in turn;

in the second half of the frame time, the electric disconnection between the input ends included in the multi-stage driving units is controlled by the on/off control circuit under the control of the on/off control signal, so as to control the multi-stage driving units included in the driving circuit to output the valid driving signals in turn, and thus corresponding transistors in the plurality of rows of pixel circuits are supplied with corresponding data voltages in turn.

In at least one embodiment of the present disclosure, the driving circuit includes N-stage driving units, where the N is a positive integer greater than 1, and the driving circuit further includes a forward scan control circuit. The driving method includes: when the driving circuit is performing forward scan, controlling electric connection between a driving signal output end included in an neo-stage driving unit and an input end included in an $(n+1)^{th}$-stage driving unit by the forward scan control circuit under the control of a forward scan control signal;

the n+1 is less than or equal to the N, and the n is a positive integer.

In at least one embodiment of the present disclosure, the driving circuit includes N-stage driving units, where the N is a positive integer greater than 1, and the driving circuit further includes a reverse scan control circuit. The driving method further includes: when the driving circuit is performing reverse scan, controlling electric connection between an input end included in an $n^{th}$-stage driving unit and a driving signal output end included in an $(n+1)^{th}$-stage driving unit by the reverse scan control circuit under the control of a reverse scan control signal;

the n+1 is less than or equal to the N, and the n is a positive integer.

The present disclosure provides in some embodiments a display device including a plurality of rows and columns of pixel circuits and the above-mentioned driving circuit;

the driving circuit is configured for providing driving signals for the pixel circuits.

Optionally, the display device includes N rows and M columns of pixel circuits and M columns of data lines, where the N and the M are integers greater than 1, a pixel circuit of an $a^{th}$ row and an $m^{th}$ column includes a data writing circuit of the at row and the $m^{th}$ column, a light-emitting control circuit of the $a^{th}$ row and the $m^{th}$ column, a third energy storage circuit of the $a^{th}$ row and the $m^{th}$ column, a fourth energy storage circuit of the $a^{th}$ row and the $m^{th}$ column, a display driving circuit of the $a^{th}$ row and the $m^{th}$ column, and a light-emitting element of the $a^{th}$ row and the $m^{th}$ column, wherein the a is a positive integer less than or equal to N, and the m is a positive integer less than or equal to the M;

the data writing circuit of the $a^{th}$ row and the $m^{th}$ column is electrically connected to an $a^{th}$ driving signal output end, a data line of the $m^{th}$ column and a control end of the display driving circuit of the $a^{th}$ row and the $m^{th}$ column, and configured for controlling electric connection between the data line of the $m^{th}$ column and the control end of the display driving circuit of the $a^{th}$ row and the $m^{th}$ column under the control of the $a^{th}$ driving signal provided by the at driving signal output end;

the light-emitting control circuit of the $a^{th}$ row and the $m^{th}$ column is electrically connected to an $a^{th}$ light-emitting control end, a power supply voltage end and a first end of the display driving circuit of the $a^{th}$ row and the $m^{th}$ column, and configured for controlling electric connection between the power supply voltage end and the first end of the display driving circuit of the $a^{th}$ row and the $m^{th}$ column under the control of an $a^{th}$ light-emitting control signal provided by the $a^{th}$ light-emitting control end;

a first end of the third energy storage circuit of the $a^{th}$ row and the $m^{th}$ column is electrically connected to the control end of the display driving circuit of the $a^{th}$ row and the $m^{th}$ column, a second end of the third energy storage circuit of the $a^{th}$ row and the $m^{th}$ column is electrically connected to the first end of the display driving circuit of the $a^{th}$ row and the ma column, and the third energy storage circuit of the $a^{th}$ row and the $m^{th}$ column is configured for storing electric energy;

a first end of the fourth energy storage circuit of the $a^{th}$ row and the $m^{th}$ column is electrically connected to the first end of the display driving circuit of the $a^{th}$ row and the $m^{th}$ column, a second end of the fourth energy storage circuit of the $a^{th}$ row and the $m^{th}$ column is electrically connected to the power supply voltage end, and the fourth energy storage circuit of the $a^{th}$ row and the $m^{th}$ column is configured for storing electric energy;

the display driving circuit of the $a^{th}$ row and the $m^{th}$ column is electrically connected to the light-emitting element of the $a^{th}$ row and the $m^{th}$ column, and configured for driving the light-emitting element of the $a^{th}$ row and the $m^{th}$ column to emit light under the control of a potential of the control end of the display driving circuit of the $a^{th}$ row and the $m^{th}$ column;

an $a^{th}$-stage driving unit included in the driving circuit is configured for providing the $a^{th}$ driving signal to the $a^{th}$ driving signal output end.

Optionally, the pixel circuit of the $a^{th}$ row and the $m^{th}$ column includes a setting circuit of the $a^{th}$ row and the $m^{th}$ column; the display driving circuit of the $a^{th}$ row and the $m^{th}$ column is electrically connected to a first electrode of the light-emitting element of the $a^{th}$ row and the $m^{th}$ column, and a second electrode of the light-emitting element of the $a^{th}$ row and the $m^{th}$ column is electrically connected to a third voltage end;

the setting circuit of the $a^{th}$ row and the $m^{th}$ column is electrically connected to an $a^{th}$ setting control end, the first electrode of the light-emitting element of the $a^{th}$ row and the $m^{th}$ column, and a setting voltage end, and configured for controlling the setting voltage end to provide a setting voltage to the first electrode of the light-emitting element of the $a^{th}$ row and the $m^{th}$ column under the control of an $a^{th}$ setting control signal provided by the $a^{th}$ setting control end.

Figure 9:
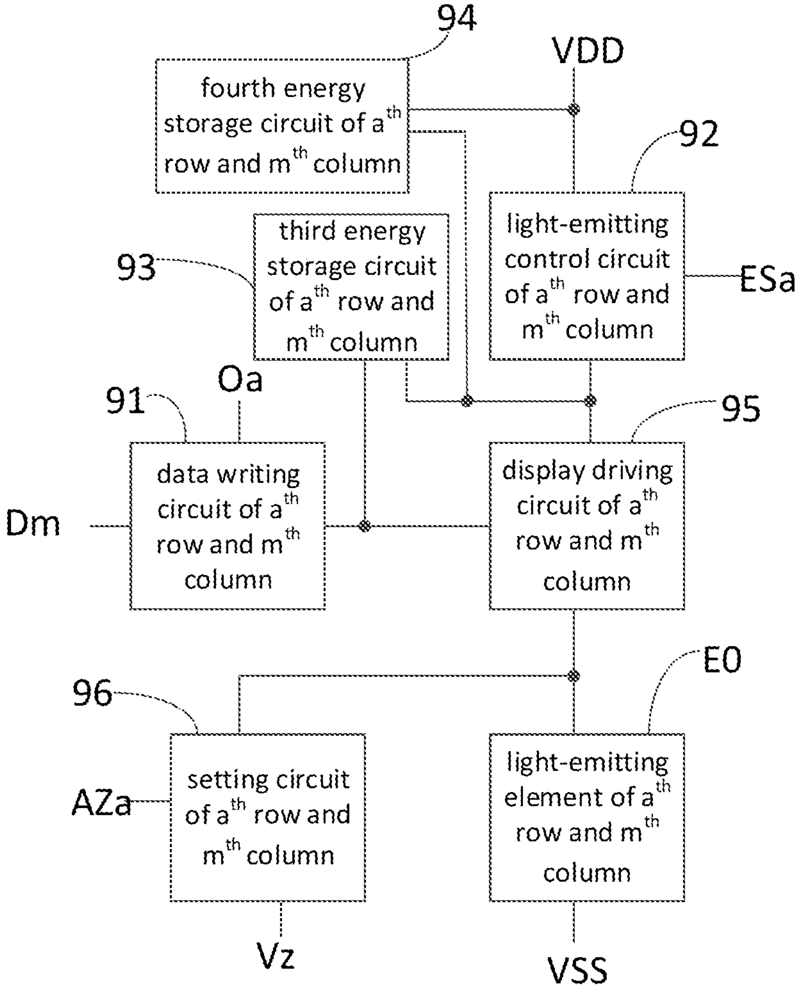
FIG. 9 is a block diagram of at least one embodiment of a pixel circuit of an at row and an m& column.

As shown in FIG. 9, a pixel circuit of an $a^{th}$ row and an $m^{th}$ column includes a data writing circuit 91 of the $a^{th}$ row and the $m^{th}$ column, a light-emitting control circuit 92 of the $a^{th}$ row and the $m^{th}$ column, a third energy storage circuit 93 of the $a^{th}$ row and the $m^{th}$ column, a fourth energy storage circuit 94 of the $a^{th}$ row and the $m^{th}$ column, a display driving circuit 95 of the $a^{th}$ row and the $m^{th}$ column, a setting circuit 96 of the $a^{th}$ row and the $m^{th}$ column and a light-emitting element E0 of the $a^{th}$ row and the $m^{th}$ column; the a is a positive integer less than or equal to N, and the m is a positive integer less than or equal to the M:

the data writing circuit 91 of the $a^{th}$ row and the $m^{th}$ column is electrically connected to an $a^{th}$ driving signal output end Oa, a data line Dm of the $m^{th}$ column and a control end of the display driving circuit 95 of the $a^{th}$ row and the $m^{th}$ column, and configured for controlling electric connection between the data line Dm of the $m^{th}$ column and the control end of the display driving circuit 95 of the $a^{th}$ row and the $m^{th}$ column under the control of the $a^{th}$ driving signal provided by the $a^{th}$ driving signal output end Oa;

the light-emitting control circuit 92 of the $a^{th}$ row and the $m^{th}$ column is electrically connected to an $a^{th}$ light-emitting control end ESa, a power supply voltage end VDD and a first end of the display driving circuit 95 of the $a^{th}$ row and the $m^{th}$ column, and configured for controlling electric connection between the power supply voltage end VDD and the first end of the display driving circuit 95 of the $a^{th}$ row and the $m^{th}$ column under the control of an $a^{th}$ light-emitting control signal provided by the a light-emitting control end ESa;

a first end of the third energy storage circuit 93 of the $a^{th}$ row and the $m^{th}$ column is electrically connected to the control end of the display driving circuit 95 of the $a^{th}$ row and the $m^{th}$ column, a second end of the third energy storage circuit 93 of the $a^{th}$ row and the $m^{th}$ column is electrically connected to the first end of the display driving circuit 95 of the $a^{th}$ row and the $m^{th}$ column, and the third energy storage circuit 93 of the $a^{th}$ row and the $m^{th}$ column is configured for storing electric energy;

a first end of the fourth energy storage circuit 94 of the $a^{th}$ row and the $m^{th}$ column is electrically connected to the first end of the display driving circuit 95 of the $a^{th}$ row and the $m^{th}$ column, a second end of the fourth energy storage circuit 94 of the $a^{th}$ row and the $m^{th}$ column is electrically connected to the power supply voltage end VDD, and the fourth energy storage circuit 94 of the $a^{th}$ row and the $m^{th}$ column is configured for storing electric energy;

the display driving circuit 95 of the $a^{th}$ row and the $m^{th}$ column is electrically connected to the light-emitting element E0 of the $a^{th}$ row and the $m^{th}$ column, and configured for driving the light-emitting element E0 of the $a^{th}$ row and the $m^{th}$ column to emit light under the control of a potential of the control end of the display driving circuit 95 of the $a^{th}$ row and the $m^{th}$ column;

an $a^{th}$-stage driving unit included in the driving circuit is configured for providing the $a^{th}$ driving signal for the $a^{th}$ driving signal output end Oa.

The display driving circuit 95 of the $a^{th}$ row and the $m^{th}$ column is electrically connected to a first electrode of the light-emitting element E0 of the $a^{th}$ row and the $m^{th}$ column, and a second electrode of the light-emitting element E0 of the $a^{th}$ row and the $m^{th}$ column is electrically connected to a second low voltage end VSS;

the setting circuit 96 of the $a^{th}$ row and the $m^{th}$ column is electrically connected to an $a^{th}$ setting control end AZa, the first electrode of the light-emitting element E0 of the $a^{th}$ row and the $m^{th}$ column, and a setting voltage end Vz, and configured for controlling the setting voltage end Vz to provide a setting voltage to the first electrode of the light-emitting element E0 of the $a^{th}$ row and the $m^{th}$ column under the control of an $a^{th}$ setting control signal provided by the $a^{th}$ setting control end AZa.

In at least one embodiment of the present disclosure, the third voltage end may be, but is not limited to, the second low voltage end.

Figure 10:
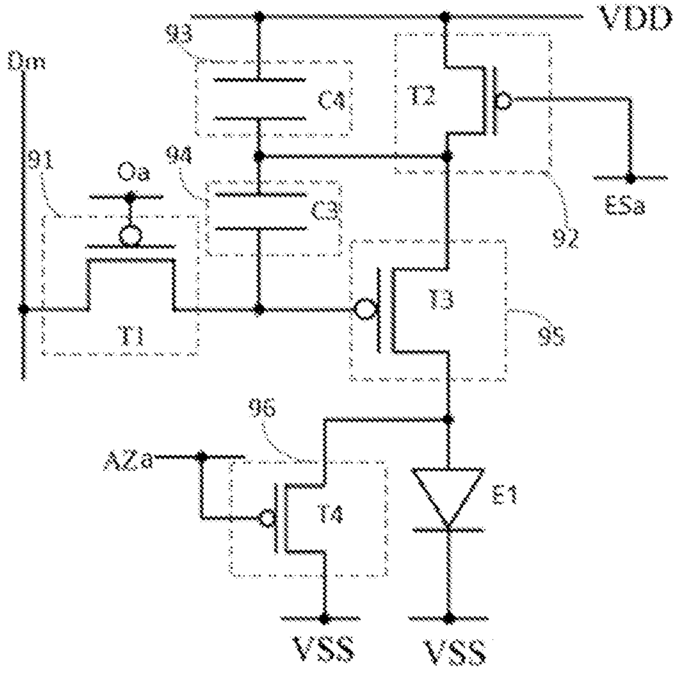
FIG. 10 is a circuit diagram of at least one embodiment of a pixel circuit of an $a^{th}$ row and an $m^{th}$ column.

As shown in FIG. 10, based on at least one embodiment of the pixel circuit of an $a^{th}$ row and an $m^{th}$ column shown in FIG. 9, the light-emitting element of an $a^{th}$ row and an $m^{th}$ column is an organic light-emitting diode E1;

the data writing circuit 91 of the $a^{th}$ row and the $m^{th}$ column includes a $m^{th}$ transistor T1; the light-emitting control circuit 92 of the $a^{th}$ row and the $m^{th}$ column includes a tenth transistor T2; the third energy storage circuit 93 of the $a^{th}$ row and the $m^{th}$ column includes a third capacitor C3; the fourth energy storage circuit 94 of the $a^{th}$ row and the $m^{th}$ column includes a fourth capacitor C4; the display driving circuit 95 of the $a^{th}$ row and the $m^{th}$ column includes an eleventh transistor T3; the setting circuit 96 of the $a^{th}$ row and the $m^{th}$ column includes a twelfth transistor T4;

the gate electrode of T1 is electrically connected to the $a^{th}$ driving signal output end Oa, the source electrode of T1 is electrically connected to the Dm, and the drain electrode of T1 is electrically connected to the gate electrode of T3;

the gate electrode of T2 is electrically connected to the $a^{th}$ light-emitting control end ESa, the source electrode of T2 is electrically connected to the power supply voltage end VDD, and the drain electrode of T2 is electrically connected to the source electrode of T0;

the drain electrode of T3 is electrically connected to the anode of E1;

the gate electrode of the T4 is electrically connected to the $a^{th}$ setting control end AZa, the source electrode of the T4 is electrically connected to the second low voltage end VSS, and the drain electrode of the T4 is electrically connected to the anode of the E1;

a first end of C3 is electrically connected to a gate electrode of T3, and a second end of C3 is electrically connected to a source electrode of T3; a first end of C4 is electrically connected to the source electrode of T3, and a second end of C4 is electrically connected to the power supply voltage end VDD;

the cathode of E1 is electrically connected to a second low voltage end VSS.

In at least one embodiment of the pixel circuits of the $a^{th}$ row and the $m^{th}$ column shown in FIG. 10, all transistors are p-type transistors, but the present disclosure is not limited thereto.

Figure 11:
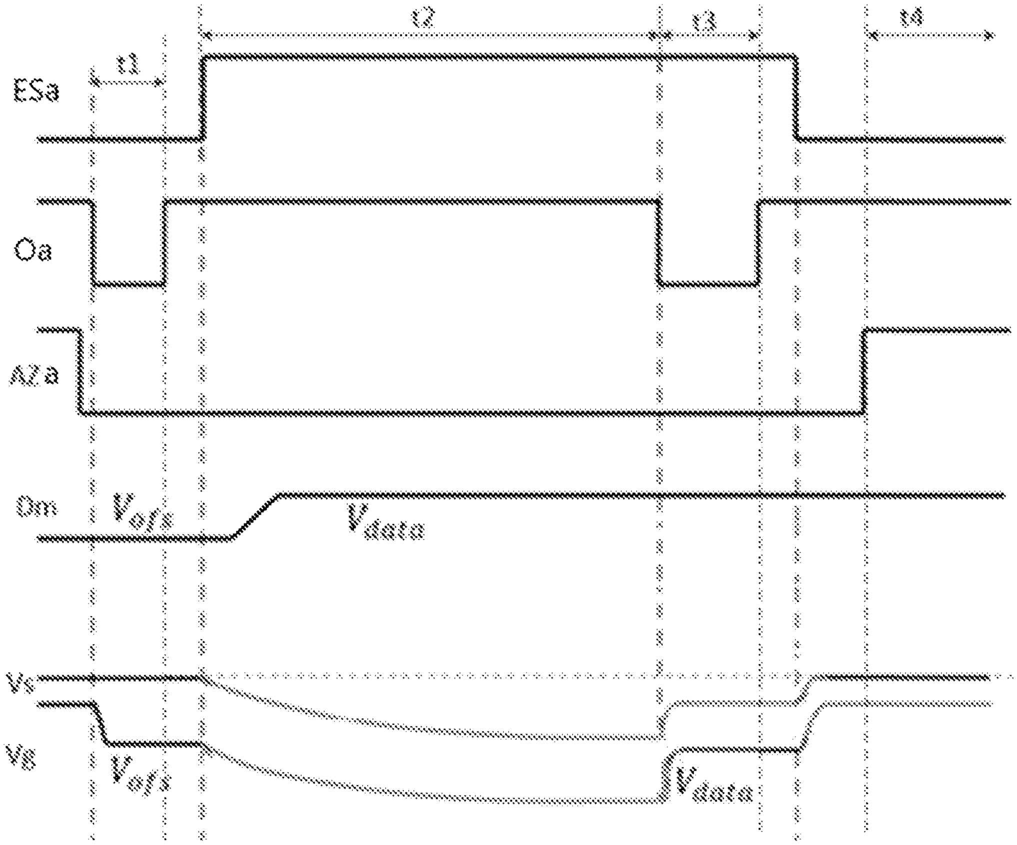
FIG. 11 is an operational timing diagram of at least one embodiment of a pixel circuit of an $a^{th}$ row and an $m^{th}$ column shown in FIG. 10.
Figure 12:
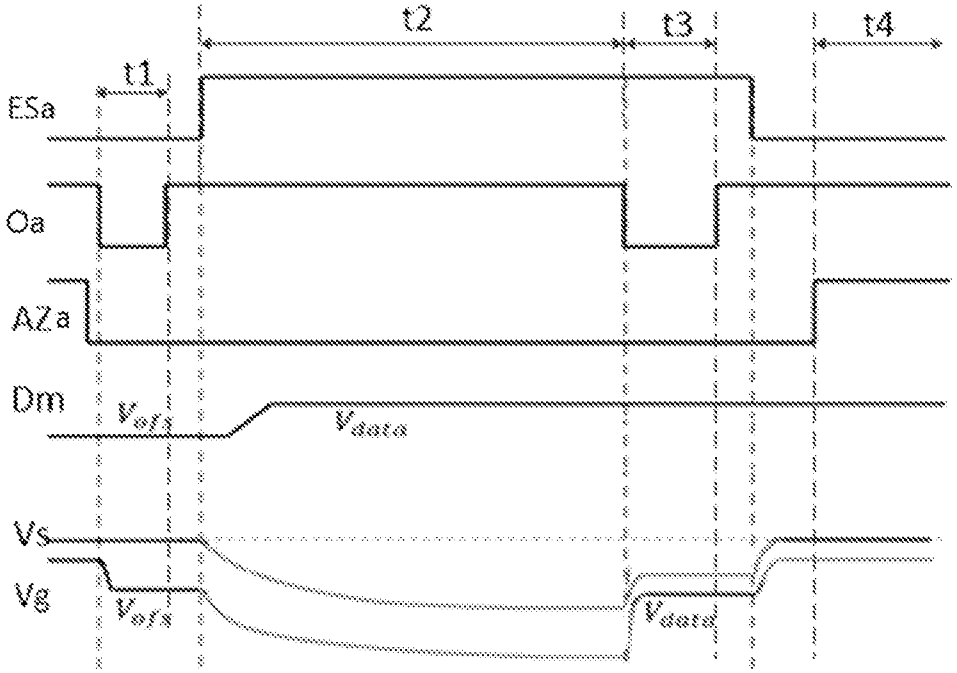
FIG. 12 is an operational timing diagram of at least one embodiment of a pixel circuit of an $a^{th}$ row and an $m^{th}$ column shown in FIG. 10.

As shown in FIGS. 11 and 12, in at least one embodiment, in the case that the pixel circuit of an $a^{th}$ row and an $m^{th}$ column shown in FIG. 10 operates.

when each of ESa, Oa and AZa outputs a low voltage signal, T2 is turned on, T1 is turned on, and T4 is turned on, and Dm provides an initial voltage Vofs, so as to write the Vofs into the gate electrode of T3 and control E1 not to emit light;

when ESa provides a high voltage signal, Oa provides a low voltage signal and AZa provides a low voltage signal, Dm provides a data voltage and T4 is turned on, so as to write Vdata to the gate electrode of T3 and control E1 not to emit light.

In FIGS. 11 and 12, Vs represents the source voltage of T3, and Vg represents the gate voltage of T3.

As shown in FIGS. 11 and 12, in at least one embodiment, in the case that the pixel circuit of an $a^{th}$ row and an $m^{th}$ column shown in FIG. 10 operates, a frame time may include an initialization phase t1, a self-discharge phase t2, a data writing phase t3 and a light-emitting phase 14 arranged sequentially in that order, in an initialization stage t1, each of the ESa, Oa and AZa outputs a low voltage signal, T2 is turned on, T1 is turned on, and T4 is turned on; Dm provides an initial voltage Vofs, so as to write the Vofs into the gate electrode of T3 and control E1 not to emit light; at this time, since the gate-source voltage of T3 is less than the Vth, T3 is turned on, wherein the Vth is a threshold voltage of T3;

in the self-discharge stage t2, Oa provides a high voltage signal, ESa provides a high voltage signal, and AZa provides a low voltage signal; T4 is turned on, a gate electrode of T3 floats. T3 is turned off, a source electrode of T3 floats and starts to discharge, and the gate electrode voltage of T3 decreases with the decrease of the source electrode voltage of T3 until the gate-source voltage of T3 is equal to Vth, and the Vth is stored in C1;

in the data writing stage t3, Oa provides a low voltage signal, ESa provides a high voltage signal, and AZa provides a low voltage signal; Dm provides a data voltage Vdata; T4 is turned on, and the Vdata is written into a gate electrode of T3; since the source electrode of T3 is floating at this moment, C3 and C4 are connected in series at this moment, and the capacitor is connected in series for dividing voltage and writing a data voltage;

in the light emission phase t4. Oa provides a high voltage signal, ESa provides a low voltage signal, AZa provides a high voltage signal, T1 is turned off, T2 is turned on, T3 is turned on, T4 is turned off, and T3 drives E1 to emit light.

In at least one embodiment of the present disclosure, firstly the pixel circuits in a single column are all supplied with the initial voltage Vofs, and then are supplied with the data voltages in the respective rows. At least one embodiment of the present disclosure can enable the data signal inputted to the data line more stable, and more robust with respect to the jump of the voltage signal provided by the source driver to the data line.

As shown in FIG. 11, when the absolute value of the threshold voltage of the eleventh transistor T3 is large, Vg and Vs are large during the self-discharge period t2;

as shown in FIG. 12, when the absolute value of the threshold voltage of the eleventh transistor T3 is small, Vg and Vs are small during the self-discharge period t2.

In at least one embodiment of the present disclosure, when the refresh frequency is 60 Hz and the display device includes 4000 rows of pixel circuits, the data line can keep outputting the initial voltage Vofs during the first half of the frame time, and the jump of the data voltage occurs only during the second half of the frame time.

Figure 13:
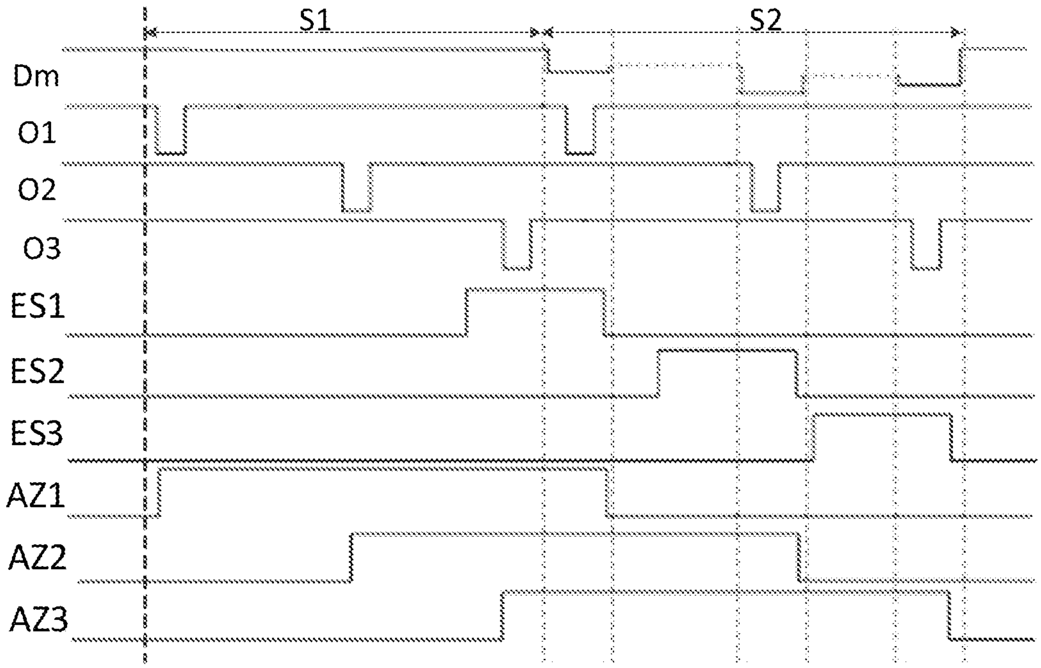
FIG. 13 is a timing diagram of signal inputted into three rows of pixel circuits included in at least one embodiment of the present disclosure.

When the display device includes a first row of pixel circuits, a second row of pixel circuits and a third row of pixel circuits, the first row of pixel circuits is electrically connected to a first driving signal output end O1, a first light-emitting control end ES1 and a first setting control end DS1, the second row of pixel circuits is electrically connected to a second driving signal output end O2, a second light-emitting control end ES2 and a second setting control end DS2, and the third row of pixel circuits is electrically connected to a third driving signal output end O3, a third light-emitting control end ES3 and a third setting control end DS3, as shown in FIG. 13;

in the first half of a frame time, S1, O1, O2 and O3 sequentially output low voltage signals in turn, Dm output an initial voltage Vofs, and a first row of pixel circuits, a second row of pixel circuits and a third row of pixel circuits are supplied with the initial voltage Vofs;

in the second half of a frame time, S2, O1, O2 and O3 sequentially output low voltage signals in turn, Dm sequentially output a first data voltage, a second data voltage and a third data voltage, and a first row of pixel circuits, a second row of pixel circuits and a third row of pixel circuits are sequentially supplied with the respective data voltages.

In at least one embodiment of the present disclosure, alternatively, all rows of pixel circuits included in the display device may be simultaneously supplied with the initial voltage during a first output stage included in the first half of the frame time, and sequentially supplied with the respective data voltages in turn during the second half of the frame time.

In at least one embodiment of the present disclosure, the display device may be, but is not limited to, a silicon-based Organic Light Emitting Diode (OLED) micro display.

The silicon-based OLED micro display generally includes a drive module called the silicon-based Backplate (BP) part. The BP part may include multiple parts, such as a pixel driving circuit array, a source driver, a gate driver, an emission driver (light-emitting control driver), an Oscillator (OSC), a gamma register, an interface and a display control module. The OLED device generally includes the OLED, a Thin Film Encapsulation (TFE), a Color Filter (CF) and a micro lens. The traditional silicon-based backplane integrates the pixel driving circuit, the source driver, the gate driver, the OSC, the gamma register and the display control module onto one chip using integrated circuit manufacturing technology; the pixel driving circuit, the source driver, the gate driver and the emission driver are analog circuit modules, while the gamma register, the interface and the display control module are mainly digital modules; and the silicon-based backplane integrating the digital modules and the analog modules is typically a System On Chip (SOC). Since both the analog parts and the digital parts are arranged on the same chip, and the manufacturing process node of the chip is determined by the digital parts having higher requirements than the analog parts, the typical silicon-based driving backplane of the single chip uses an integrated circuit manufacturing process of 0.11 μm or less than 55 nm. As the demand for large Field of View (FOV) of Virtual Reality (VR) device increases, the VR device manufacturers requires larger silicon-based micro displays. The size of the silicon-based micro display has evolved from a small size of 0.39 inch, 0.50 inch, etc. to 1 inch or more (which is currently the mainstream). As the size of the micro display increases, the number of silicon-based driving backplanes fabricated from a 12-inch piece of wafer decreases from hundreds to tens, and the manufacturing cost of the single silicon-based driving backplate increases 5-10 times. Therefore, for a high-cost large-size silicon-based driving backplane, it has been proposed to separate analog circuit parts (such as pixel driving circuit array, source driver, gate driver and emission driver) from OSC, gamma register, interface and display control module, i.e., dividing one chip into two chips. Among them, the size of the analog circuit part is determined by the size of the display area of the silicon-based micro display, but the manufacturing process thereof is required to be low, so that the cost of this part may be reduced using a low complexity process, and since the digital part has been separated, the size thereof is reduced as compared to the one chip, and the number of cuts on the 12 inch wafer increases, so that the cost is further reduced. In addition, the digital circuit part generally includes OSC, gamma register, interface, and display control module, is of a small size, and is manufactured through high complexity circuit manufacturing process, which reduces the cost by increasing the number of cuts on the 12-inch wafer. This is called two chip mode. The two chip mode adopts a mode in which the panel part is separated from the Display Driver Integrated Chip (DDIC), the processing of the OLED device is implemented on the panel, and then the inspection thereof is implemented, so as to obtain a product with the proper display function, which is bonded with the DDIC through a Chip on FPC (COF) or Chip On Chip (COC) mode, to finally obtain a controllable silicon-based micro display.

The present disclosure provides in some embodiments display control method applies to the above-mentioned display device, wherein the second half of a frame time includes N data writing stages, and the display control method includes the following steps:

in the first half of the frame time, outputting, by all of the driving units of the driving circuit, valid driving signals, providing, by data lines of the M columns, initial voltages, and providing, by data writing circuits of the N rows and the M columns under the control of driving signals provided by respective driving signal output ends, the initial voltages to control ends of display driving circuits arranged in the N rows and the M columns;

in an $a^{th}$ data writing phase, providing, by the data line of the $m^{th}$ column, a respective data voltage, and controlling, by a data writing circuit of an $a^{th}$ row and an me column under the control of an $a^{th}$ driving signal provided by an $a^{th}$ driving signal output end, electric connection of the data line of the $m^{th}$ column and a control end of the display driving circuit of the $a^{th}$ row and the $m^{th}$ column, so as to write the data voltage provided by the data line of the $m^{th}$ column into the control end of the display driving circuit of the $a^{th}$ row and the $m^{th}$ column.

The display device provided by the embodiments of the present disclosure may be any product or component having a display function, such as a mobile phone, a tablet computer, a television, a display, a notebook computer, a digital photo frame, a navigator, etc.

The above dare preferred implementations of the present disclosure. It should be noted that those skilled in the art can make various improvements and modifications without departing from the principle of the present disclosure. These improvements and modifications shall also fall within the protection scope of the present disclosure.

What is claimed is:

1. A driving circuit, comprising multi-stage driving units and an on/off control circuit; wherein each of the multi-stage driving units comprises an input end and a driving signal output end, and configured for outputting, according to an input signal provided by the input end, a corresponding driving signal via the driving signal output end;

an input end of a first-stage driving unit of the multi-stage driving units is electrically connected to a start signal end;

the on/off control circuit is electrically connected to an on/off control end and the input ends of the multi-stage driving units, and configured for controlling, under the control of an on/off control signal provided by the on/off control end, electric connection or electric disconnection of the input ends of the multi-stage driving units, to control the multi-stage driving units to output valid driving signals in a first half of a frame time, and control the multi-stage driving units to output the valid driving signals in turn in a second half of the frame time;

the driving circuit comprises N-stage driving units, the N being a positive integer greater than 1; wherein the on/off control circuit comprises N−1 on/off control transistors;

a control electrode of an $n^{th}$ on/off control transistor is electrically connected to the on/off control end, a first electrode of the $n^{th}$ on/off control transistor is electrically connected to an input end of an $n^{th}$-stage driving unit, and a second electrode of the $n^{th}$ on/off control transistor is electrically connected to an input end of an $(n+1)^{th}$ stage driving unit; and the n+1 is less than or equal to the N, and the n is a positive integer.

2. The driving circuit according to claim 1, wherein the driving circuit further comprises a forward scan control circuit;

the forward scan control circuit is electrically connected to a forward scan control end, a driving signal output end of the $n^{th}$-stage driving unit and the input end of the $(n+1)^{th}$-stage driving unit, and configured for controlling, under the control of a forward scan control signal provided by the forward scan control end, electric connection between the driving signal output end of the $n^{th}$-stage driving unit and the input end of the $(n+1)^{th}$-stage driving unit.

3. The driving circuit according to claim 2, wherein the forward scan control circuit comprises N−1 forward scan control transistors;

a control electrode of an $n^{th}$ forward scan control transistor is electrically connected to the forward scan control end, a first electrode of the $n^{th}$ forward scan control transistor is electrically connected to the driving signal output end of the $n^{th}$-stage driving unit, and a second electrode of the $n^{th}$ forward scan control transistor is electrically connected to the input end of the $(n+1)^{th}$-stage driving unit.

4. The driving circuit according to claim 3, wherein the N−1 forward scan control transistors are all n-type transistors, or the N−1 forward scan control transistors are all p-type transistors.

5. The driving circuit according to claim 1, wherein the driving circuit further comprises a reverse scan control circuit;

the reverse scan control circuit is electrically connected to a reverse scan control end, the input end of the $n^{th}$-stage driving unit and a driving signal output end of the $(n+1)^{th}$-stage driving unit, and configured for controlling, under the control of a reverse scan control signal provided by the reverse scan control end, electric connection between the input end of the $n^{th}$-stage driving unit and the driving signal output end of the $(n+1)^{th}$-stage driving unit.

6. The driving circuit according to claim 5, wherein the reverse scan control circuit comprises N−1 reverse scan control transistors;

a control electrode of an $n^{th}$ reverse scan control transistor is electrically connected to the reverse scan control end, a first electrode of the $n^{th}$ reverse scan control transistor is electrically connected to the input end of the $n^{th}$-stage driving unit, and a second electrode of the $n^{th}$ reverse scan control transistor is electrically connected to the driving signal output end of the $(n+1)^{th}$-stage driving unit.

7. The driving circuit according to claim 6, wherein the N−1 reverse scan control transistors are all n-type transistors, or the N−1 reverse scan control transistors are all p-type transistors.

8. The driving circuit according to claim 1, wherein the N−1 on/off control transistors are all n-type transistors, or the N−1 on/off control transistors are all p-type transistors.

9. The driving circuit according to claim 1, wherein each of the driving units comprises a first node control circuit, a second node control circuit, a first energy storage circuit, a second energy storage circuit, and an output circuit;

the first node control circuit is electrically connected to a first clock signal end, an input end, a first node, a second clock signal end, a second node and a first voltage end, and configured for controlling, under the control of a first clock signal provided by the first clock signal end, electric connection between the first node and the input end, and controlling, under the control of a second clock signal provided by the second clock signal end and a potential of the second node, electric connection between the first node and the first voltage end;

the second node control circuit is electrically connected to the first node, the second node, the first clock signal end and a second voltage end, and configured for controlling, under the control of a potential of the first node, electric connection between the second node and the first clock signal end, and controlling, under the control of the first clock signal, electric connection between the second node and the second voltage end;

the first energy storage circuit is electrically connected to the first node, and configured for storing electrical energy;

the second energy storage circuit is electrically connected to the second node, and configured for storing electrical energy;

the output circuit is electrically connected to the first node, the second node, the first voltage end, the second clock signal end and the driving signal output end, and configured for controlling, under the control of the potential of the first node, electric connection between the driving signal output end and the second clock signal end, and controlling, under the control of the potential of the second node, electric connection between the driving signal output end and the first voltage end.

10. The driving circuit according to claim 1, wherein each of the driving units comprises a first node control circuit, a second node control circuit, an output control node control circuit, a first energy storage circuit, a second energy storage circuit, and an output circuit;

the first node control circuit is electrically connected to a first clock signal end, an input end, a first node, a second clock signal end, a second node and a first voltage end, and configured for controlling, under the control of a first clock signal provided by the first clock signal end, electric connection between the first node and the input end, and controlling, under the control of a second clock signal provided by the second clock signal end and a potential of the second node, electric connection between the first node and the first voltage end;

the second node control circuit is electrically connected to the first node, the second node, the first clock signal end and a second voltage end, and configured for controlling, under the control of a potential of the first node, electric connection between the second node and the first clock signal end, and controlling, under the control of the first clock signal, electric connection between the second node and the second voltage end;

the output control node control circuit is electrically connected to the second voltage end, the first node and an output control node, and configured for controlling, under the control of a second voltage signal provided by the second voltage end, electric connection between the first node and the output control node;

the first energy storage circuit is electrically connected to the output control node, and configured for storing electrical energy;

the second energy storage circuit is electrically connected to the second node, and configured for storing electrical energy;

the output circuit is electrically connected to the output control node, the second node, the first voltage end, the second clock signal end and the driving signal output end, and configured for controlling, under the control of a potential of the output control node, electric connection between the driving signal output end and the second clock signal end, and controlling, under the control of the potential of the second node, electric connection between the driving signal output end and the first voltage end.

11. A driving method for the driving circuit according to claim 1, comprising:

controlling, by the on/off control circuit under the control of the on/off control signal, the electric connection or the electric disconnection of the input ends of the multi-stage driving units, to control all of driving units of the driving circuit to output the valid driving signals in the first half of the frame time, and control the multi-stage driving units to output the valid driving signals in turn in the second half of the frame time.

12. The driving method according to claim 11, wherein the driving circuit is configured for providing driving signals for pixel circuits of a display panel, and the first half of the frame time comprises a first input stage and a first output stage arranged sequentially in that order, and the driving method comprises:

in the first input stage, controlling, by the on/off control circuit under the control of the on/off control signal, electric connection of the input ends of the multi-stage driving units;

in the first output stage, outputting, by all of the driving units of the driving circuit, the valid driving signals;

in the second half of the frame time, controlling, by the on/off control circuit under the control of the on/off control signal, the electric disconnection of the input ends of the multi-stage driving units, to enable the multi-stage driving units of the driving circuit to output the valid driving signals in turn.

13. The driving method according to claim 11, wherein the driving circuit is configured for providing driving signals for pixel circuits of a display panel; the driving method comprises:

in the first half of the frame time, controlling, by the on/off control circuit under the control of the on/off control signal, the electric disconnection of the input ends of the multi-stage driving units, to control all of the driving units of the driving circuit to output the valid driving signals simultaneously;

in the second half of the frame time, controlling, by the on/off control circuit under the control of the on/off control signal, the electric disconnection of the input ends of the multi-stage driving units, to control the multi-stage driving units of the driving circuit to output the valid driving signals in turn.

14. The driving method according to claim 11, wherein the driving circuit further comprises a forward scan control circuit; the driving method comprising: when the driving circuit is performing forward scan, controlling, by the forward scan control circuit under the control of a forward scan control signal, electric connection of a driving signal output end of the $n^{th}$-stage driving unit and the input end of the $(n+1)^{th}$-stage driving unit.

15. The driving method according to claim 11, wherein the driving circuit further comprises a reverse scan control circuit; the driving method further comprising: when the driving circuit is performing reverse scan, controlling, by the reverse scan control circuit under the control of a reverse scan control signal, electric connection of the input end of the $n^{th}$-stage driving unit and a driving signal output end of the $(n+1)^{th}$-stage driving unit.

16. A display device, comprising pixel circuits arranged in rows and columns and the driving circuit according to claim 1, wherein the driving circuit is configured for providing driving signals for the pixel circuits.

17. The display device according to claim 16, comprising pixel circuits arranged in N rows and M columns, the N and the M being integers greater than 1; wherein a pixel circuit of an $a^{th}$ row and an $m^{th}$ column comprises a data writing circuit of the $a^{th}$ row and the $m^{th}$ column, a light-emitting control circuit of the $a^{th}$ row and the $m^{th}$ column, a third energy storage circuit of the $a^{th}$ row and the $m^{th}$ column, a fourth energy storage circuit of the $a^{th}$ row and the $m^{th}$ column, a display driving circuit of the $a^{th}$ row and the $m^{th}$ column, and a light-emitting element of the $a^{th}$ row and the $m^{th}$ column, wherein the a is a positive integer less than or equal to N, and the m is a positive integer less than or equal to the M;

the data writing circuit of the $a^{th}$ row and the $m^{th}$ column is electrically connected to an $a^{th}$ driving signal output end, a data line of the $m^{th}$ column and a control end of the display driving circuit of the $a^{th}$ row and the $m^{th}$ column, and configured for controlling, under the control of the $a^{th}$ driving signal provided by the $a^{th}$ driving signal output end, electric connection of the data line of the $m^{th}$ column and the control end of the display driving circuit of the $a^{th}$ row and the $m^{th}$ column;

the light-emitting control circuit of the $a^{th}$ row and the $m^{th}$ column is electrically connected to an $a^{th}$ light-emitting control end, a power supply voltage end and a first end of the display driving circuit of the $a^{th}$ row and the $m^{th}$ column, and configured for controlling, under the control of an $a^{th}$ light-emitting control signal provided by the $a^{th}$ light-emitting control end, electric connection of the power supply voltage end and the first end of the display driving circuit of the $a^{th}$ row and the $m^{th}$ column;

a first end of the third energy storage circuit of the $a^{th}$ row and the $m^{th}$ column is electrically connected to the control end of the display driving circuit of the $a^{th}$ row and the $m^{th}$ column, a second end of the third energy storage circuit of the $a^{th}$ row and the $m^{th}$ column is electrically connected to the first end of the display driving circuit of the $a^{th}$ row and the $m^{th}$ column, and the third energy storage circuit of the $a^{th}$ row and the $m^{th}$ column is configured for storing electric energy;

a first end of the fourth energy storage circuit of the $a^{th}$ row and the $m^{th}$ column is electrically connected to the first end of the display driving circuit of the $a^{th}$ row and the $m^{th}$ column, a second end of the fourth energy storage circuit of the $a^{th}$ row and the $m^{th}$ column is electrically connected to the power supply voltage end, and the fourth energy storage circuit of the $a^{th}$ row and the $m^{th}$ column is configured for storing electric energy;

the display driving circuit of the $a^{th}$ row and the $m^{th}$ column is electrically connected to the light-emitting element of the $a^{th}$ row and the $m^{th}$ column, and configured for driving, under the control of a potential of the control end of the display driving circuit of the $a^{th}$ row and the $m^{th}$ column, the light-emitting element of the $a^{th}$ row and the $m^{th}$ column to emit light;

an $a^{th}$-stage driving unit of the driving circuit is configured for providing the $a^{th}$ driving signal to the $a^{th}$ driving signal output end.

18. The display device according to claim 17, wherein the pixel circuit of the $a^{th}$ row and the $m^{th}$ column comprises a setting circuit of the $a^{th}$ row and the $m^{th}$ column; the display driving circuit of the $a^{th}$ row and the $m^{th}$ column is electrically connected to a first electrode of the light-emitting element of the $a^{th}$ row and the $m^{th}$ column, and a second electrode of the light-emitting element of the $a^{th}$ row and the $m^{th}$ column is electrically connected to a third voltage end;

the setting circuit of the $a^{th}$ row and the $m^{th}$ column is electrically connected to an $a^{th}$ setting control end, the first electrode of the light-emitting element of the $a^{th}$ row and the $m^{th}$ column, and a setting voltage end, and configured for controlling, under the control of an $a^{th}$ setting control signal provided by the $a^{th}$ setting control end, the setting voltage end to provide a setting voltage to the first electrode of the light-emitting element of the $a^{th}$ row and the $m^{th}$ column.

19. A display control method for the display device according to claim 17, wherein the second half of the frame time comprises N data writing phases, and the display control method comprises:

in the first half of the frame time, outputting, by all of the driving units of the driving circuit, valid driving signals, providing, by data lines of the M columns, initial voltages, and providing, by data writing circuits of the N rows and the M columns under the control of driving signals provided by respective driving signal output ends, the initial voltages to control ends of display driving circuits arranged in the N rows and the M columns;

in an $a^{th}$ data writing phase, providing, by the data line of the $m^{th}$ column, a respective data voltage, and controlling, by a data writing circuit of an $a^{th}$ row and an $m^{th}$ column under the control of an $a^{th}$ driving signal provided by an $a^{th}$ driving signal output end, electric connection of the data line of the $m^{th}$ column and a control end of the display driving circuit of the $a^{th}$ row and the $m^{th}$ column.

* * * * *